(12) United States Patent
Steinbach et al.

(10) Patent No.: US 7,732,083 B2
(45) Date of Patent: Jun. 8, 2010

(54) GAS DIFFUSION LAYER INCORPORATING A GASKET

(75) Inventors: Andrew J. L. Steinbach, Minneapolis, MN (US); Mark K. Debe, Stillwater, MN (US); Jimmy M. Le, Saint Paul, MN (US); Stephan J. Obradovich, Menomonie, WI (US); Eric J. Iverson, Eau Claire, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 537 days.

(21) Appl. No.: 11/611,553

(22) Filed: Dec. 15, 2006

(65) Prior Publication Data

US 2008/0143061 A1  Jun. 19, 2008

(51) Int. Cl.
*H01M 2/08* (2006.01)
*H01M 4/00* (2006.01)
*H01M 4/82* (2006.01)

(52) U.S. Cl. .......................... 429/36; 429/40; 29/623.4
(58) Field of Classification Search .................. 429/36, 429/40; 29/623.4
See application file for complete search history.

(56) References Cited

U.S. PATENT DOCUMENTS

| | | | |
|---|---|---|---|
| 4,812,352 A | 3/1989 | Debe | |
| 5,879,827 A | 3/1999 | Debe et al. | |
| 6,136,412 A | 10/2000 | Spiewak et al. | |
| 7,195,690 B2 | 3/2007 | Mekala et al. | |
| 2003/0003342 A1 | 1/2003 | Sugita et al. | |
| 2003/0008194 A1 | 1/2003 | Cargneli et al. | |
| 2003/0082430 A1 | 5/2003 | Suzuki | |
| 2003/0104262 A1* | 6/2003 | Kuroki et al. | 429/36 |
| 2003/0221311 A1 | 12/2003 | Smith et al. | |
| 2004/0115513 A1 | 6/2004 | Yang | |
| 2004/0241525 A1 | 12/2004 | Mekala et al. | |
| 2005/0095490 A1 | 5/2005 | Mittelstadt et al. | |

(Continued)

FOREIGN PATENT DOCUMENTS

EP  1 624 512 A2  2/2006

(Continued)

OTHER PUBLICATIONS

U.S. Appl. No. 11/224,879, filed Sep. 13, 2005, now pending, Titled: "Multilayered Nanostructured Films".

*Primary Examiner*—Patrick Ryan
*Assistant Examiner*—Thomas H. Parsons
(74) *Attorney, Agent, or Firm*—Julie A. Lapos-Kuchar; Philip Y. Dahl

(57) ABSTRACT

A gas diffusion layer incorporating a gasket (GIG) is described along with assemblies incorporating the GIG subassembly. Processes for making the GIG and membrane electrode assemblies (MEAs) incorporating the GIG are also described. A GIG subassembly includes a gas diffusion layer (GDL) and a gasket bonded to the GDL. The gasket includes a first gasket layer and a second gasket layer. The second gasket layer is formed of a gasket material in contact with the first gasket layer and the GDL. The gasket material of the second gasket layer bonds the GDL to the first gasket layer. An adhesive layer, and optionally a removable adhesive liner, is disposed on a surface of the first gasket layer opposite the second gasket layer. In some MEA configurations, the GDL is disposed within an aperture in the first gasket layer.

29 Claims, 19 Drawing Sheets

U.S. PATENT DOCUMENTS

| | | |
|---|---|---|
| 2005/0118491 A1 | 6/2005 | Ramsey et al. |
| 2006/0048540 A1 | 3/2006 | Voss et al. |
| 2006/0110647 A1 | 5/2006 | Sherman et al. |
| 2006/0127738 A1 | 6/2006 | Sompalli et al. |
| 2006/0141328 A1 | 6/2006 | Johnston et al. |
| 2007/0059452 A1 | 3/2007 | Debe et al. |

FOREIGN PATENT DOCUMENTS

| | | |
|---|---|---|
| KR | 2006/0000461 | 6/2006 |
| WO | WO 96/19015 | 6/1996 |
| WO | WO 2006/075867 A1 | 7/2006 |

* cited by examiner

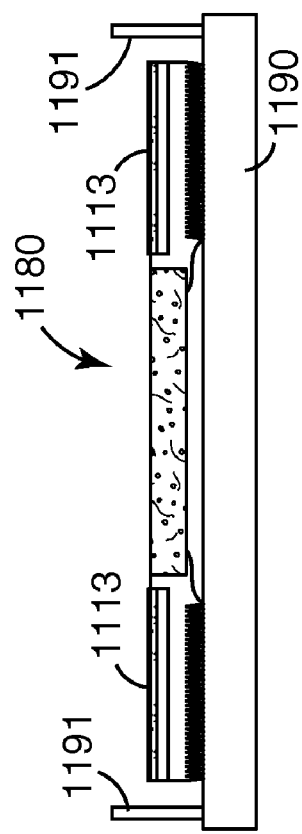
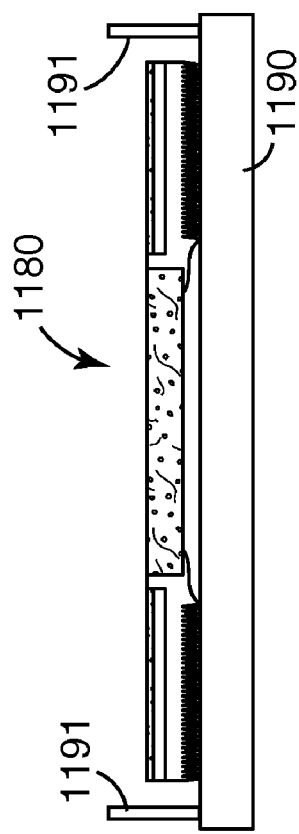
Figure 11A
Figure 11B

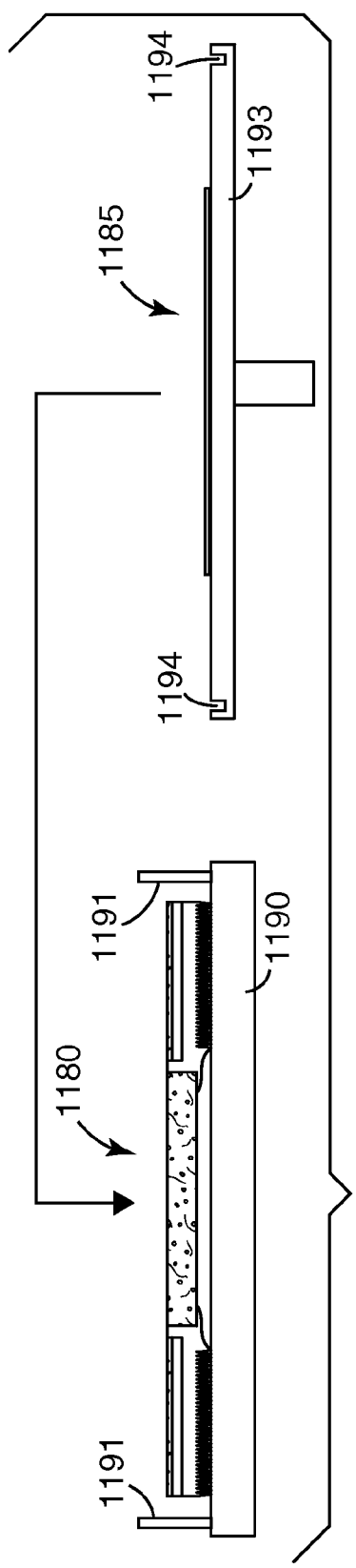
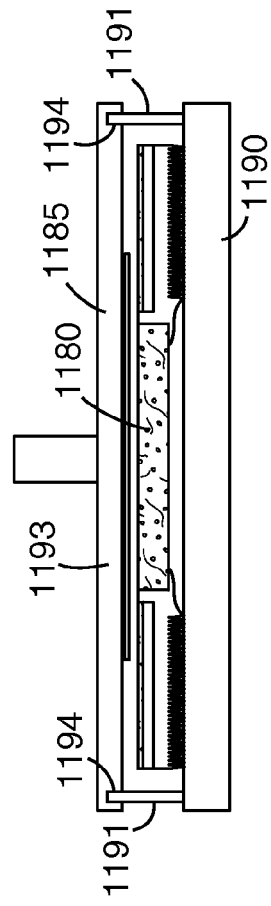
*Figure 11C*
*Figure 11D*

GAS DIFFUSION LAYER INCORPORATING A GASKET

FIELD OF THE INVENTION

The present invention relates generally to fuel cells and, more particularly, to a gasketed gas diffusion layer for a membrane electrode assembly.

BACKGROUND OF THE INVENTION

A typical fuel cell power system includes a power section in which one or more stacks of fuel cells are provided. The efficacy of the fuel cell power system depends in large part on the integrity of the various contacting and sealing interfaces within individual fuel cells and between adjacent fuel cells of the stack.

To achieve the power needed for some implementations, a fuel cell stack can include large numbers of membrane electrode assemblies (MEAs), flow field plates, and sealing gaskets. These and other components of the stack must be carefully aligned and assembled. Misalignment of even a few components can lead to gas leakage, hydrogen crossover, and performance/durability deterioration.

The durability of the fuel cell membrane during extended operation often determines whether fuel cells can be used cost effectively. Although an MEA can fail in a number of ways, one typical failure mechanism is excessive gas crossover caused by the puncture of the membrane or repetitive physical deformation at an edge of the active area due to swelling and shrinkage of the membrane with humidity cycling.

There is a need for an MEA having an improved durability and lifetime. The present invention fulfills these and other needs.

SUMMARY OF THE INVENTION

The present invention is directed to a gas diffusion layer incorporating a gasket (GIG), assemblies using the GIG, and processes for making the GIG and membrane electrode assemblies (MEAs) incorporating the GIG.

In one embodiment, a GIG subassembly for an MEA includes a gas diffusion layer (GDL) and a gasket bonded to the GDL. The gasket includes a first gasket layer and a second gasket layer. The second gasket layer is formed of a gasket material in contact with at least a portion of an edge and/or surface of the first gasket layer and at least a portion of an edge and/or surface of the GDL. The gasket material of the second gasket layer bonds the GDL to the first gasket layer. An adhesive layer and an optional adhesive liner are disposed on a surface of the first gasket layer opposite from the second gasket layer. The GDL may be disposed within an aperture in the first gasket layer or may overlap the first gasket layer.

In some implementations, the second gasket layer is disposed over at least a portion of a surface of the GDL. The gasket material of the second gasket layer may penetrate the GDL at the edge and/or surface of the GDL. The gasket material of the second gasket layer may penetrate the surface and/or edge of the first gasket layer.

The first and/or the second gasket layers may have microstructured features to enhance the sealing properties of the gasket in some configurations. In other configurations, the sealing surfaces of the first and/or second gasket layers may be substantially flat.

The first gasket layer may comprise a polymer, such as polyethylene naphthalate (PEN), polyethylene telephthalate (PET), polyimide, or other rigid polymeric materials that are sufficiently thin, sufficiently strong, and sufficiently compatible with the fuel cell environment. The gasket material of the second gasket layer may comprise silicone, rubber, a fluropolymer, or various thermosetting flexible polymers for example.

Another embodiment of the invention is directed to a membrane electrode assembly (MEA). The MEA includes an electrolyte membrane, catalyst layers and GIGs. The catalyst layers may be disposed on the electrolyte membrane forming a catalyst coated membrane (CCM) or on surfaces of GDLs facing the membrane. In various configurations, the electrolyte membrane may comprise microstructured features and/ or one or both of the first and second catalyst layers comprise a nanostructured thin film (NSTF) catalyst. For example the NSTF catalyst may include catalyst particles disposed on acicular nanostructured support whiskers.

Another embodiment of the invention involves a fuel cell stack. The fuel cell stack includes an MEA including two GDLs incorporating a gasket (GIGs) disposed between flow field plates, the flow field plates contacting the gaskets of the GIGs under compressive force. The MEA includes an electrolyte membrane, catalyst layers and first and second subassemblies, each subassembly comprising a GDL and a gasket bonded to the GDL. The gasket includes a first gasket layer having an adhesive layer disposed on one surface. The gasket also includes a second gasket layer comprising a gasket material in contact with at least one surface of the first gasket layer and the GDL.

Yet another embodiment of the invention involves a method of making a subassembly for a membrane electrode assembly. Subassembly components are prepared by positioning a gas diffusion layer (GDL) relative to a first gasket layer and placing a flowable or deformable gasket material on one surface of the first gasket layer. A pressure sensitive adhesive and removable adhesive liner may be disposed on the opposing surface of the first gasket layer. The subassembly components are molded to achieve a bond between the first gasket layer and the GDL, the bond formed by the gasket material.

Preparation of the subassembly components may involve cutting an aperture in the first gasket layer and positioning a gas diffusion layer within the aperture. In one implementation, a bead of flowable gasket material may be placed on the first gasket layer and/or on the mold plate prior to molding. After molding, the flowable gasket material may be cured. The mold plate used for the molding may include microstructured features so that the second gasket layer can be formed to have microstructured features embossed in the flowable gasket material. The molding process may facilitate achieving a predetermined thickness of the subassembly components.

According to another implementation, a precut frame of a material that is processable by one or both of heat and pressure, referred to herein as a heat/pressure processable material, is placed proximate to the GDL and the first gasket layer. For example, the heat/pressure processable material may be placed over an edge of the GDL and over an edge of the first gasket layer. The GDL, precut frame, and first gasket layer are hot pressed, forming a second gasket layer from the heat/ pressure processable material that bonds the GDL to the first gasket layer. The heat/pressure processable material is sufficiently flowable or deformable under one or both of heat and pressure to achieve the formation of a bond between the first gasket layer and the GDL.

Another embodiment of the invention is directed to a method of making a membrane electrode assembly. First and second GIGs are formed. Each GIG formed is by cutting an aperture in a gasket comprising at least a first gasket layer. A GDL is positioned within or over the aperture. A heat/pressure processable gasket material is placed on or near the first gasket layer and/or on a mold plate. The first gasket layer, GDLs, and the heat/pressure processable gasket material are molded to achieve a bond between the first gasket layer and the GDL formed by the heat/pressure processable gasket material. An electrolyte membrane and catalyst layers are arranged between the first and second gasketed GDL subassemblies. According to one aspect of the invention, the electrolyte membrane has catalyst layers disposed thereon, forming a catalyst coated membrane (CCM). According to another aspect, the catalyst layers are disposed on the GDLs of the first and second GIGs.

According to one aspect of the invention, a CCM is arranged between first and second GIGs. For example, the CCM is placed on a first GIG and a second GIG is placed on the CCM so that the CCM is sandwiched between the first and second GIGs. The gasket of one or both of the GIGs may include a pressure sensitive adhesive layer having a removable adhesive liner. Removal of the adhesive liner, if used, from the second GIG prior to placing the second GIG on the CCM exposes the adhesive layer of the second GIG. Pressure is applied to attach the second GIG to the CCM and/or to the first GIG via the pressure sensitive adhesive layer.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIGS. 11A-11H are a series of diagrams illustrating a process for making an MEA incorporating GIGs in accordance with embodiments of the invention.

Figure 1:
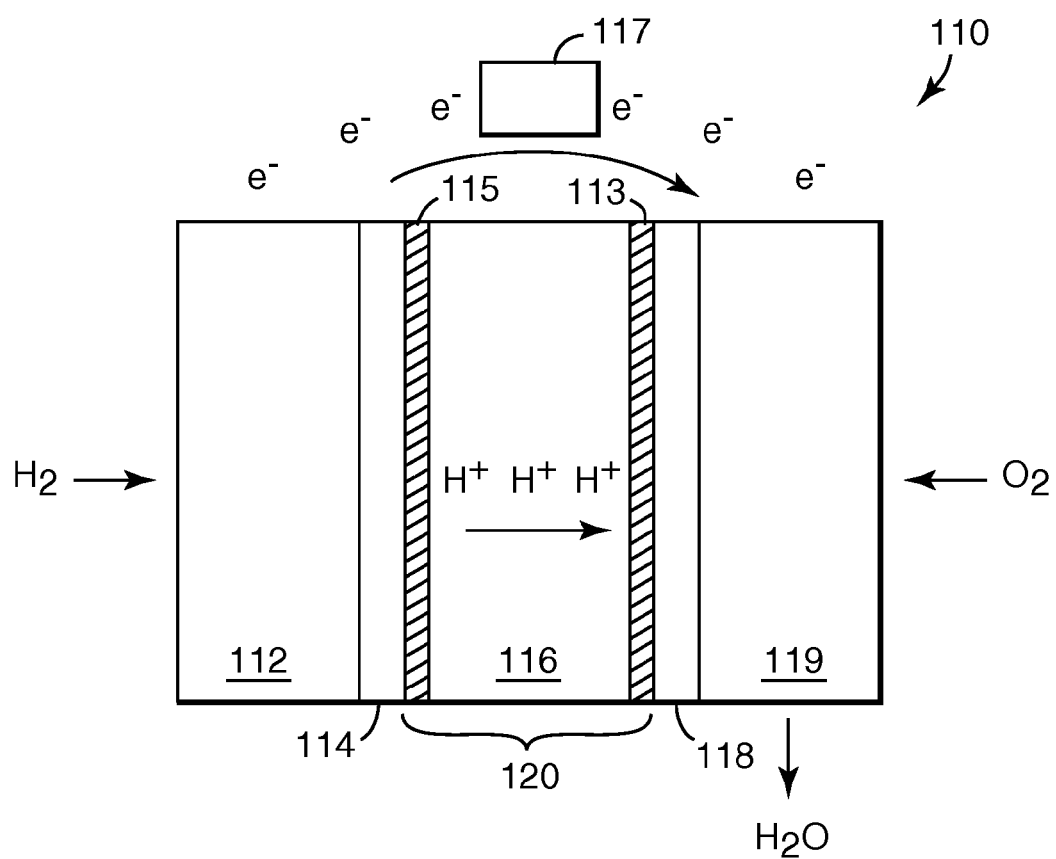
FIG. 1 illustrates the operation of a fuel cell.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

Embodiments of the present invention are directed to a gas diffusion layer (GDL) bonded to a gasket, referred to herein as a gas diffusion layer incorporating a gasket (GIG) or GIG subassembly. Prior gasketing approaches require that the gasket layer bonds well to the catalyst coated membrane (CCM). Insufficient bonding results in leaks that occur when the MEA is placed under operating conditions. Insufficient bonding also leads to difficulty in handling subassemblies during manufacture and stack assembly processes if the gasket fails to adhere and falls off the electrolyte membrane. The gasketing approaches described herein provide enhanced bonding at the GDL/CCM interface and are particularly advantageous when used in conjunction with nanostructured thin film catalyst layers.

A membrane electrode assembly (MEA) may incorporate one or more GIGs according to embodiments described herein. Some embodiments of the invention involve processes for making the GIG subassemblies and processes for making MEAs incorporating the GIG subassemblies. In some embodiments described herein, the gaskets of first and second GIGs of an MEA are bonded together, eliminating the need for the GDL to be securely bonded to the CCM. In some embodiments, the GIG subassemblies and/or MEAs incorporating GIGs may be fabricated as roll goods.

The GIGs of the present invention are particularly useful in polymer electrolyte membrane (PEM) fuel cell applications. A typical fuel cell configuration is depicted in FIG. 1. The fuel cell 110 shown in FIG. 1 includes a first fluid flow plate 112 adjacent a first GIG 114. Adjacent the GIG 114 is a catalyst coated electrolyte membrane (CCM) 120 comprising an electrolyte membrane 116 and catalyst layers 115, 113. A second GIG 118 is situated adjacent the CCM 120, and a second fluid flow plate 119 is situated adjacent the second GIG 118.

In operation, hydrogen fuel is introduced into the anode portion of the fuel cell 110, passing over the first fluid flow plate 112 and through the GDL portion of the first GIG 114. At the interface of the GDL of the first GIG 114 and the CCM 120, on the surface of the catalyst 115, the hydrogen fuel is separated into hydrogen ions ($H^+$) and electrons ($e^-$).

The electrolyte membrane 116 of the CCM 120 permits only the hydrogen ions or protons to pass through the electrolyte membrane 116 to the cathode catalyst 113 of the fuel cell 110. The electrons cannot pass through the electrolyte membrane 116 and, instead, flow through an external electrical circuit in the form of electric current. This current can power an electric load 117, such as an electric motor, or be directed to an energy storage device, such as a rechargeable battery.

Oxygen flows through the GDL portion of the second GIG 118 at the cathode side of the fuel cell 110 via the second fluid flow plate 119. On the surface of the cathode catalyst 113 oxygen, protons, and electrons combine to produce water and heat.

Individual fuel cells, such as that shown in FIG. 1, can be combined with a number of other fuel cells to form a fuel cell stack. The number of fuel cells within the stack determines the total voltage of the stack, and the surface area of the active areas of the cells determines the total current. The total electrical power generated by a given fuel cell stack can be determined by multiplying the total stack voltage by total current.

Figure 2A:
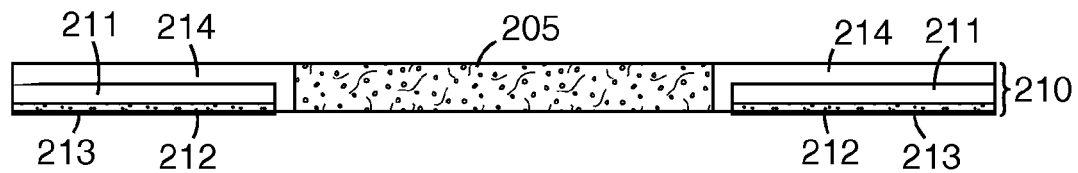
FIGS. 2A-2D depict gas diffusion layers incorporating gaskets (GIGs) in accordance with various embodiments of the invention.
Figure 2B:
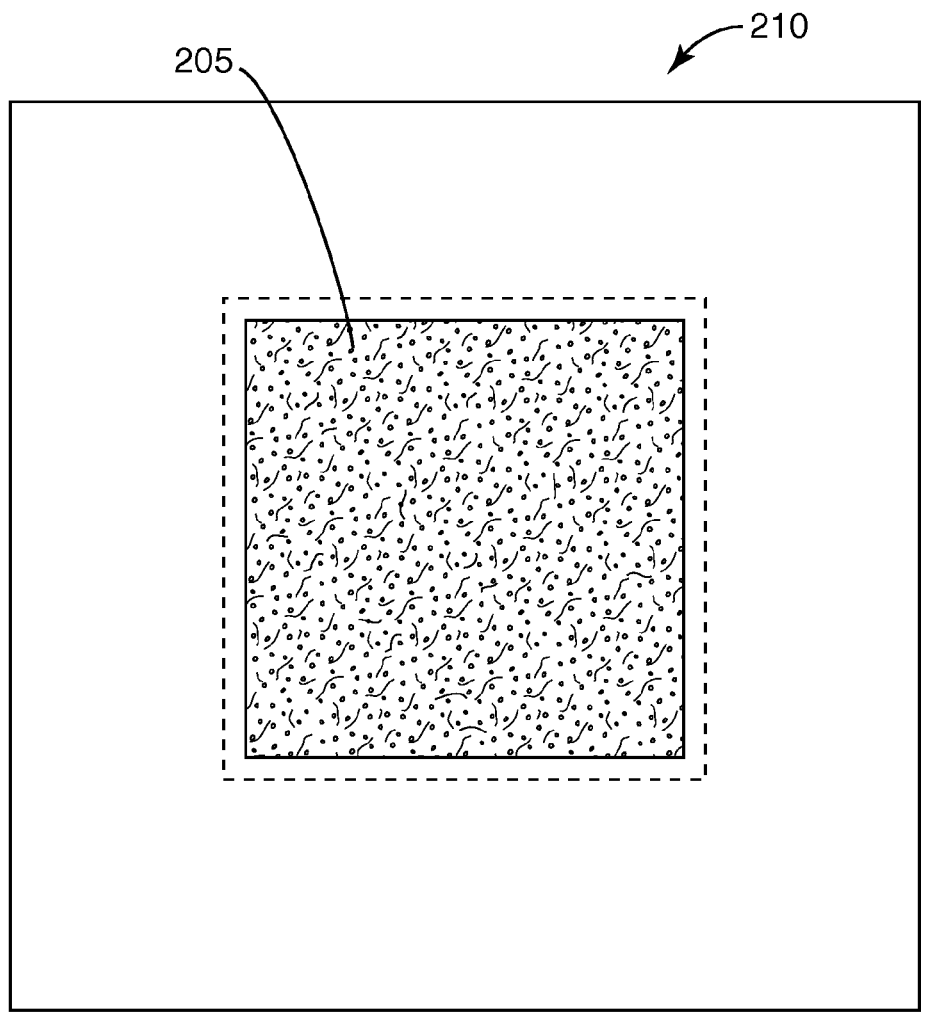

FIGS. 2A and 2B illustrate cross sectional and plan views, respectively, of a GIG in accordance with one embodiment. The GIG includes a gasket 210 and a gas diffusion layer (GDL) 205. The GDL 205 can be made of any material capable of collecting electrical current from the electrode while allowing reactant gasses to pass through, typically a woven or non-woven carbon fiber paper or cloth.

The gasket 210 is a layered structure including a first gasket layer 211 positioned relative to the GDL 205. In one embodiment, as best seen in FIG. 2A, the GDL 205 is slightly smaller than an aperture in the first gasket layer 211. The GDL 205 is positioned within the aperture of the first gasket layer 211. The first gasket layer 211 may comprise various types of polymer material, such as polyimide, polyethylene naphthalate (PEN), polyethylene telephthalate (PET) and/or other materials such as rigid polymeric materials that are sufficiently thin, sufficiently strong, and sufficiently compatible with the fuel cell environment, i.e., temperatures of 80-100C with exposure to water, hydrogen, or oxygen, and that provide a surface facilitating adherence to the adhesive layer as well as the second gasket layer 214.

The gasket 210 includes an adhesive layer 212 and an optional adhesive liner 213 disposed on one surface of the first gasket layer 211. The adhesive layer 212 may comprise a pressure sensitive adhesive (PSA) or a heat activated adhesive. For example, the adhesive layer 212 may comprise any of the following: acrylic PSA's, rubber based adhesives, ethylene maleic anhydride copolymers, olefin adhesives such as copolymers of 1-octene with ethylene or propylene, nitrile based adhesives, epoxy based adhesives, and urethane based adhesives. In some embodiments, the adhesive layer 212 may comprise a thermally activated adhesive, such as Thermobond 845 (polyethylene maleate based) or Thermobond 583 (nitrile rubber based).

The gasket 210 includes a second gasket layer 214 in contact with the first gasket layer 211 and the GDL 205. The second gasket layer 214 may be substantially flat as shown in FIG. 2A, or may include surface features. For example, a substantially flat gasket surface may be used to facilitate sealing against a fuel cell stack separator plate or flow field plate that has appropriate ridges for making the seal. In this configuration, the flat gasket deforms against the separator or flow field plate to make the seal. A gasket surface having microstructured features, described below, may be useful to provide enhanced sealing against a substantially flat flow field plate, for example.

The material forming the second gasket layer 214 bonds the first gasket layer 211 to the GDL 205. In one configuration, the material forming the second gasket layer 214 comprises a silicone material. In other embodiments, the second gasket layer 214 may be formed of rubber, fluoropolymer or other deformable, flowable and/or curable materials, for example. In various embodiments, the second gasket layer comprises a material, denoted herein as a heat/pressure processable material that flows or deforms under application of one or both of heat and pressure. The heat/pressure processable material is sufficiently flowable or deformable under heat and/or pressure to form a bond between the first gasket layer and the GDL.

Any suitable gasket material may be used for the second gasket layer, including thermoplastic materials and curable materials. Thermoplastic elastomers and elastomeric adhesives may also be used as gasket materials. The elastomeric gasket is typically not electrically conductive. The gasket material may be selected from rubbers such as ethylene propylene diene monomer rubber (EPDM rubber) or butyl rubber, or silicones. Curable materials are substantially fixed when they are substantially cured. Substantially cured typically means cured to a degree such that the gasket material will maintain a stable shape in the absence of an external force. Additional further curing steps may follow. Thermoplastic materials are substantially fixed when they are cooled below their $T_g$.

Figure 2C:
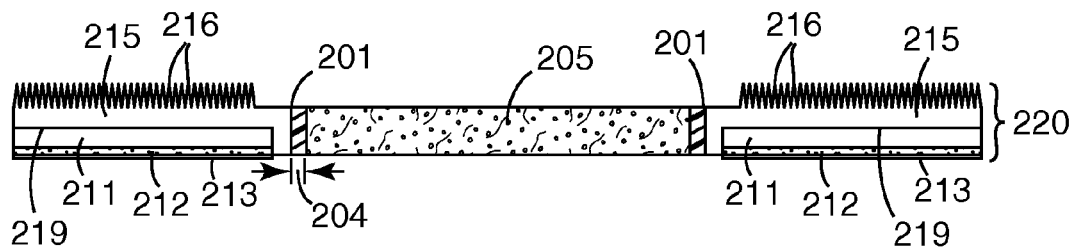
Figure 2D:
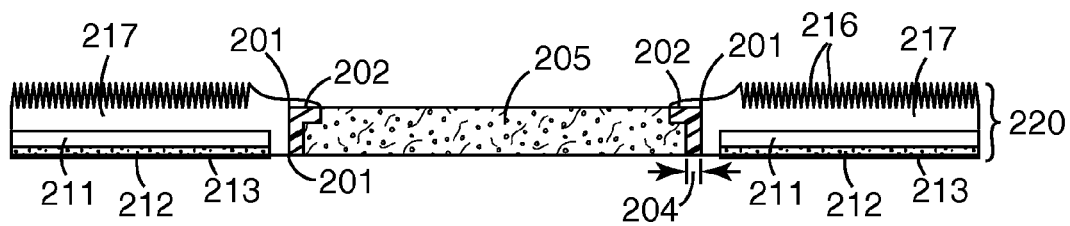

FIG. 2C illustrates a configuration for the GIG in accordance with another embodiment. The GIG includes a gasket 220 bonded to a GDL 205. In this configuration, one surface of the second gasket layer 215 includes microstructured features 216. In some implementations, the microstructured features 216 enhance the sealing properties of the GIG. The microstructured features 216 illustrated in FIGS. 2C-2D are illustrated as triangular peaks and valleys, but in other embodiments the microstructured features may take on any of a variety of other shapes. For example, in one embodiment, the microstructured features may comprise closely packed hexagons. The microstructured features may be present on one or both of the first gasket layer and the second gasket layer.

In some implementations, the height of the microstructured features may be chosen to fit a flow field plate where the sealing surface of the gasket is co-planar with the top of the flow field. In other implementations, the sealing surface of the gasket may be recessed some amount from the top of the flow field. The recessed implementation allows the microstructured features to be taller, allowing for an enhanced seal tolerance in the presence of inhomogeneities in plate thickness.

The material of the second gasket layer 215 is in contact with, and forms a bond between, the first gasket layer 211 and the GDL 205. The second gasket layer 215 is disposed on a surface 219 of the first gasket layer 211 opposite the adhesive layer 212 and is adjacent the GDL 205 at an edge region 201 of the GDL. In some implementations, as illustrated by FIG. 2C, the material of the second gasket layer 215 may contact an edge 201 of the GDL 205 and the gasket material may penetrate the GDL edge 201 to a certain depth 204, to facilitate bonding the second gasket 215 layer to the GDL 205.

FIG. 2D illustrates a GIG in accordance with another embodiment. In this embodiment, the second gasket layer 217 of the GIG includes microstructured surface features 216. The material of the second gasket layer 217 contacts the edge 201 of the GDL and also contacts a portion of the surface 202 of the GDL 205 near the edge 201. The material of the second gasket layer 217 may penetrate the surface 202 and/or edge 201 of the GDL 205 to a certain depth 204. The depth of penetration should be sufficient to hold the GDL and gasket together for the intended purpose of handling and MEA assembly, but not so large as to decrease the active area of the MEA significantly. For example, in various embodiments, the depth of penetration may comprise a range of about 0.1 to about 5 mm, a range of about 0.5 mm to about 3 mm, a range of about 0.5 mm to about 2 mm, or a range of about 0.5 mm to about 1 mm.

Figure 3A:
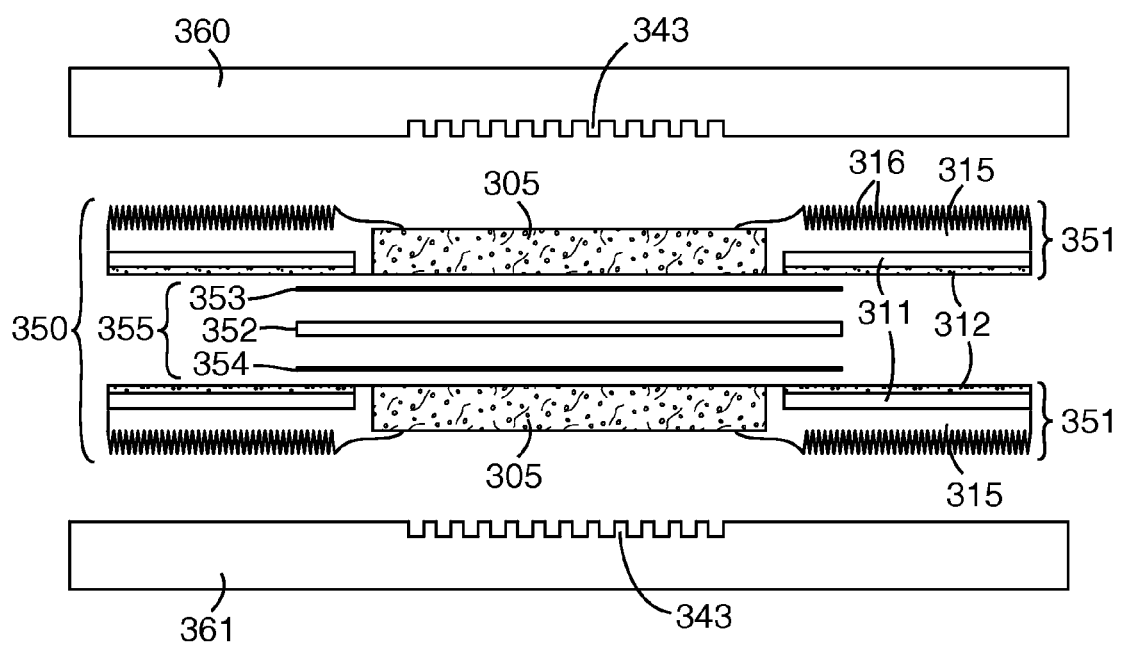
FIGS. 3A and 3B illustrate expanded and compressed views, respectively, of a membrane electrode assembly (MEA) incorporating a catalyst coated membrane (CCM) and GIGs in accordance with embodiments of the invention.
Figure 3B:
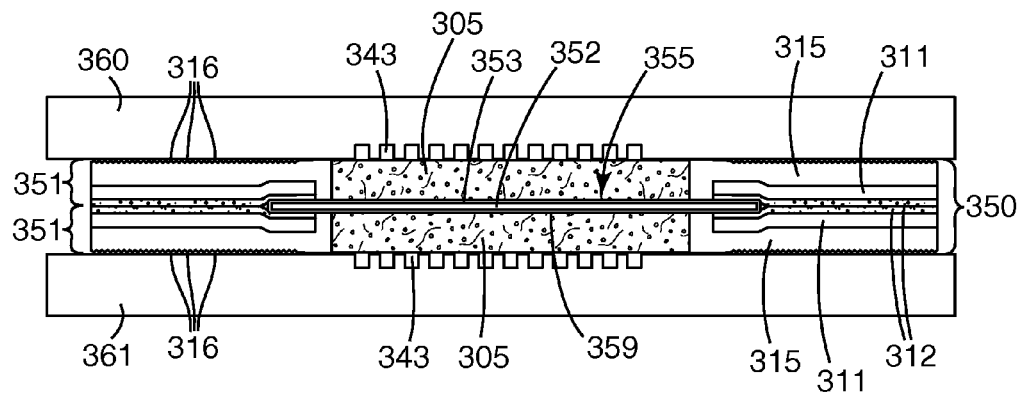

Referring now to FIGS. 3A and 3B, there is illustrated a single cell assembly of a fuel cell stack in accordance with an embodiment of the invention. FIG. 3A illustrates an expanded view of the single fuel cell assembly. FIG. 3B provides a cross sectional view of the single fuel cell assembly after compression. In FIGS. 3A and 3B, the fuel cell stack comprises a five layer MEA 350, incorporating two GIGs 351, as described above, between fluid flow plates 360, 361. As illustrated in FIG. 3B, the MEA 350 includes an electrolyte membrane 352 between anode 353 and cathode 359 catalyst layers. In some configurations, one or both of the anode 353 and cathode 354 catalyst layers may be disposed on the surfaces of the electrolyte membrane 352 forming a catalyst coated membrane (CCM) 355. In other configurations, the catalyst layers 353, 359 may be disposed on the surface of the GDLs 305. In yet other configurations, the catalyst layers 353, 359 may be disposed partially on the electrolyte membrane 352 and partially on the GDLs 305.

Each GIG 351 includes a GDL 305, a first gasket layer 311, adhesive layer 312 and second gasket layer 315 that bonds the first gasket layer 311 to the GDL 305. Prior to assembly of the gasketed MEA 350, the GIGs 351 may include an adhesive liner that is removed during assembly of the MEA 350. The adhesive layers 312 of the GIGs 351 adhere to the surfaces of the CCM 355 and to each other to form the gasketed MEA 350.

Figure 3C:
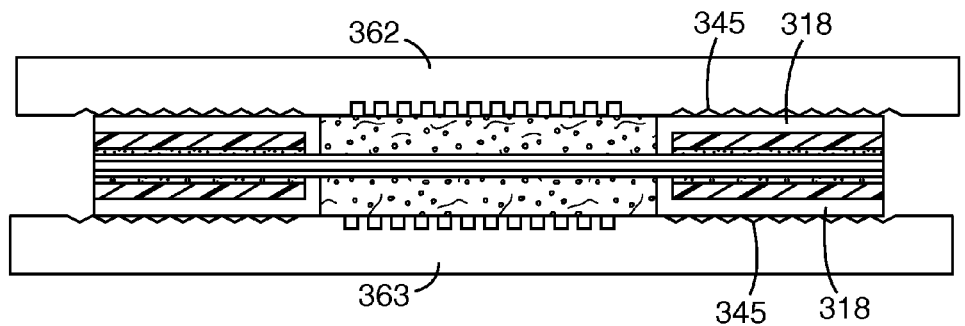
FIG. 3C illustrates a single fuel cell assembly where the GIGs have substantially flat surfaces to facilitate sealing against flow field plates having grooves in accordance with embodiments of the invention.

In the example provided in FIGS. 3A and 3B, the second gasket layer 315 of each GIG 351 includes optional microstructured features 316 to facilitate sealing between the GIGs 351 and the fuel flow plates 360, 361. Each of the flow field plates 360, 361 includes a field of gas flow channels 343 and ports through which hydrogen and oxygen fuels pass. In the configuration depicted in FIGS. 3A and 3B, flow field plates 360, 361 are configured as monopolar flow field plates. In other configurations, the flow field plates 360, 361 may comprise bipolar fluid flow plates to facilitate stacking multiple MEAs to achieve a desired voltage across the fuel cell stack. In the example provided in FIG. 3C, the surface of the second gasket layer 318 is substantially flat. The second gasket layers 318 are compressed between fuel flow plates 362, 363 having ridges 345.

Figure 3D:
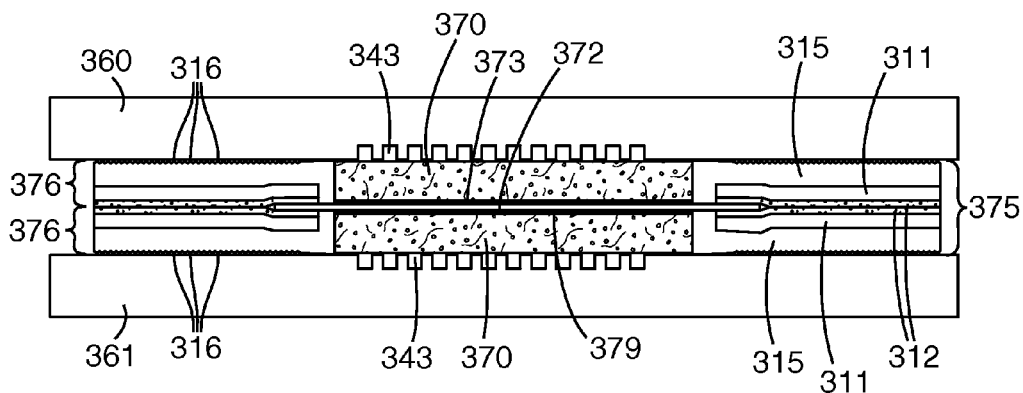
FIG. 3D illustrates a single fuel cell assembly where the GIGs include the catalyst layers disposed on the GDLs in accordance with embodiments of the invention.
Figure 3E:
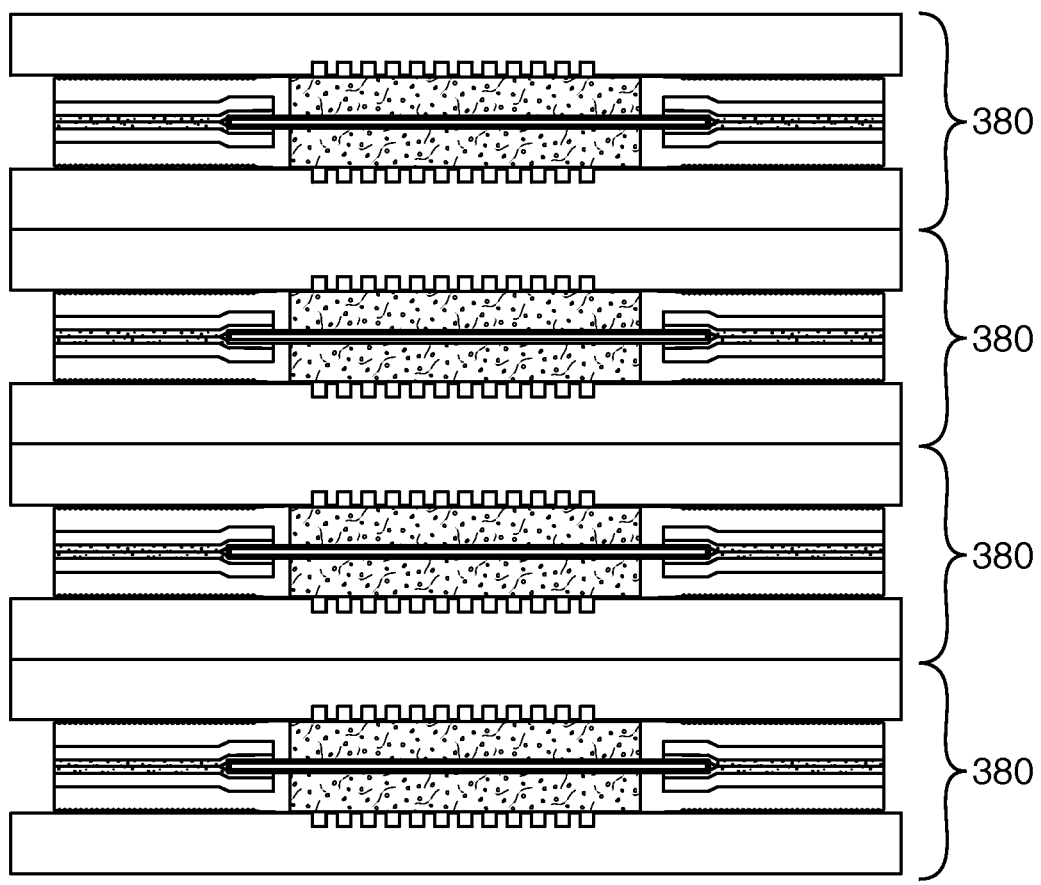
FIG. 3E illustrates a fuel cell including multiple single cells, each single cell incorporating GIGs in accordance with embodiments of the invention.

FIG. 3D illustrates a single cell assembly similar to the assembly of FIG. 3B, except the MEA 375 includes an electrolyte membrane 372 without catalyst layers rather than a CCM. The GIGs 376 include GDLs 370 having catalyst layers 373, 379 disposed thereon. FIG. 3E illustrates a fuel cell stack incorporating multiple cells 380.

Figure 4A:
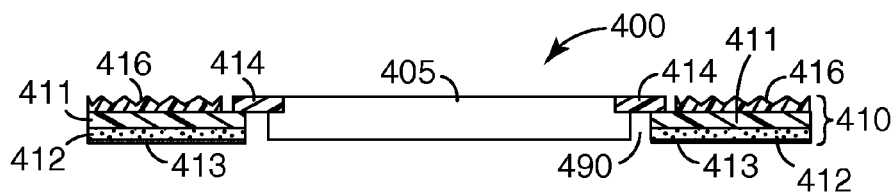
FIGS. 4A and 4B are cross sectional view and plan views, respectively, of a gas diffusion layer incorporating a gasket (GIG) constructed in accordance with an embodiment of the present invention.
Figure 4B:
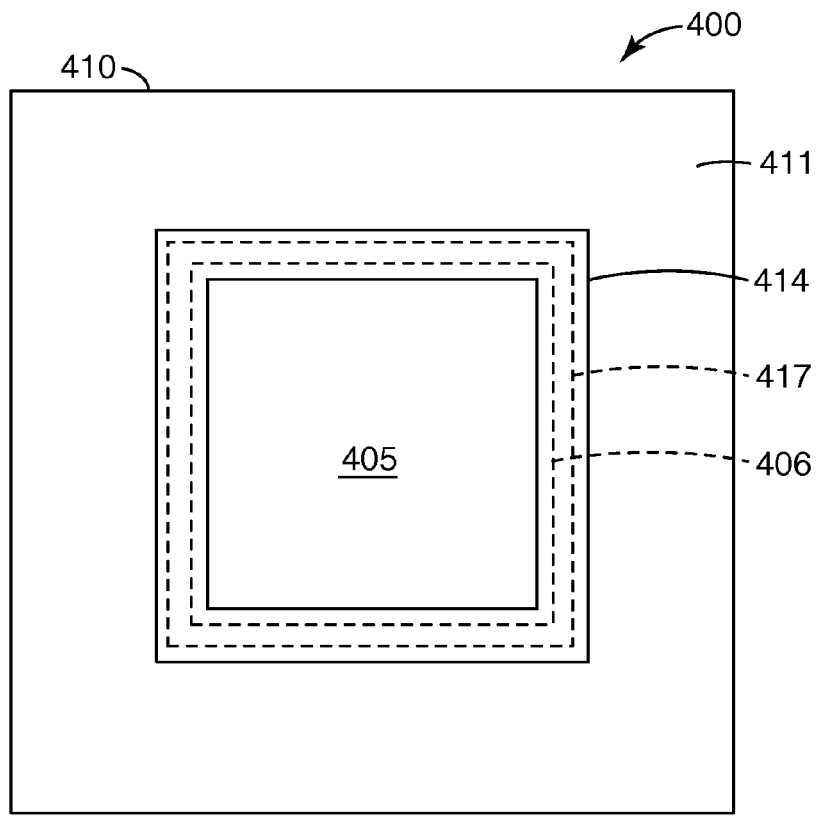

FIGS. 4A and 4B provide cross sectional and plan views, respectively, of a GIG 400 in accordance with one embodiment. The GIG 400 includes a gasket 410 and gas diffusion layer (GDL) 405.

The gasket 410 is a layered structure including a first gasket layer 411 positioned relative to the GDL 405. In one embodiment, as best seen in FIG. 4A, the GDL 405 is slightly smaller than an aperture 490 in the first gasket layer 411. In this embodiment, the GDL 405 is positioned within the aperture 490 of the first gasket layer 411. As previously discussed, the first gasket layer 411 may comprise various types of polymer material, such as polyimide, polyethylene naphthalate (PEN), polyethylene telephthalate (PET) and/or other similar materials, including rigid polymeric materials that are sufficiently thin, sufficiently strong, and sufficiently compatible with the fuel cell environment, i.e., temperatures of 80-100C, in the presence of water, hydrogen and/or oxygen.

The gasket 410 includes an adhesive layer 412 disposed on one surface of the first gasket layer 411 and optionally includes an adhesive liner 413. The material of the first gasket layer 411 and the adhesive layer 412 are selected so that the adhesive layer 412 adheres well to the first gasket layer 411. The adhesive layer 412 may comprise a pressure sensitive adhesive (PSA) or heat activated adhesive.

The gasket 410 includes a second gasket layer 414 that bonds together the GDL 405 and the first gasket layer 411. In various embodiments discussed herein, the second gasket layer 414 may be formed from a material that is solid at room temperature and is processed by heat and/or pressure to form the bond between the GDL 405 and the first gasket layer 411. Application of heat and/or pressure to the material causes the material to flow or to deform sufficiently to form the bond between the GDL 405 and the first gasket layer 411. The material used to form the second gasket layer 414 is referred to herein as a heat/pressure processable material. Suitable materials for formation of the second gasket layer include, for example, heat processable polymers or thermoplastic sealing materials. The thermoplastic materials can be a fluoroplastic like THV (terpolymer of tetrafluoroethylene, hexafluoropropylene and vinylidene difluoride), polyethylene, copolymers of polyethylene such as those of ethylene and acrylic acid, Thermo-Bond 845 (manufactured by 3M, e.g., a polyethylene maleic anhydride copolymer) and Thermo-Bond 668 (manufactured by 3M, e.g., a polyester). Blends of these material or composite materials of these with fillers such as carbon, glass, ceramic, etc. may also be used as thermoplastics. The melt range may be 50-180° C., for example, or 100-150° C.

In one embodiment, a surface of the first gasket layer 411 and/or the second gasket layer 414 may include surface features such as microstructured features 416. In some implementations, the microstructured features 416 enhance the sealing properties of the GIG. The microstructured features 416 may be formed in a variety of shapes including closely packed hexagons, or any other shape. As previously discussed, in certain embodiments, the height of the microstructured features 416 can be chosen to fit a separator flow field plate where the sealing surface of the GIG is co-planar with the top of the flow field, or where the sealing surface is recessed some amount. The recessed version allows the microstructured features 416 to be taller, allowing for increased seal tolerance in the presence of inhomogeneities in plate thickness. In some instances, the preferred surface feature 416 of the first and/or second gasket layers 411, 414 is substantially flat to facilitate bonding to a fuel cell flow field plate that has appropriate ridges for making the seal.

Figure 4C:
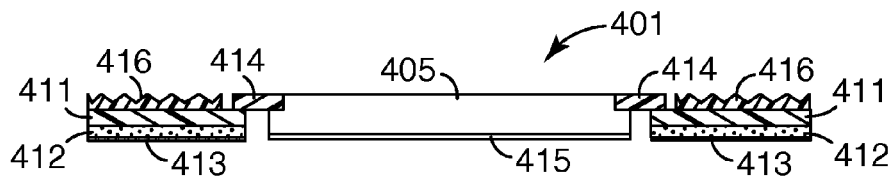
FIG. 4C is a cross sectional view of a GIG including a catalyst coated GDL in accordance with an embodiment of the present invention.

In some embodiments, a heat/pressure processable material that is used to form the second gasket layer 414 is cut into a frame having an aperture and is placed over an outer edge 406 (FIG. 4B) of the GDL 405 and an inner edge 417 of the first layer gasket 411. After placement, heat and/or pressure are applied to the subassembly, causing some of the heat/pressure processable material to flow into the adjacent edge and/or surface of the GDL 405 and into the adjacent edge and/or surface of the first gasket layer 411. Application of heat and/or pressure causes the second gasket layer 414 to adhere to both the first gasket layer 411 and the GDL 405, thus attaching the first gasket layer 411 to the GDL 405. The surface of the compression tool used for the hot press may have the microstructure features on it (in negative) to develop microstructured features on the surface of the first and/or second gasket layers 411, 414. In some embodiments the GDL 405 of a GIG 401 may additionally include a catalyst layer 415 disposed on one surface, as illustrated in FIG. 4C.

Figure 4D:
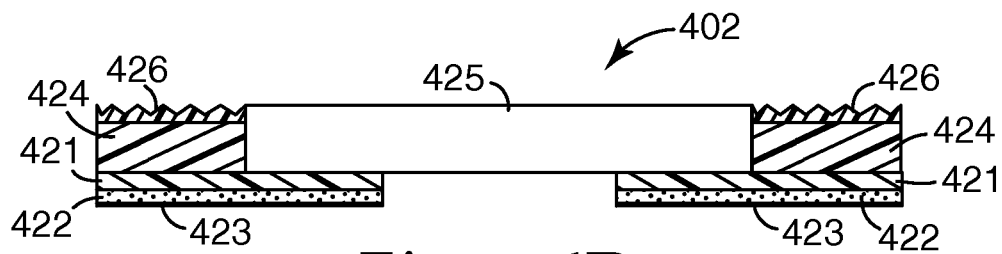
FIGS. 4D and 4E are cross sectional views of GIGs where the first gasket layer is disposed under the GDL in accordance with embodiments of the invention.
Figure 4E:
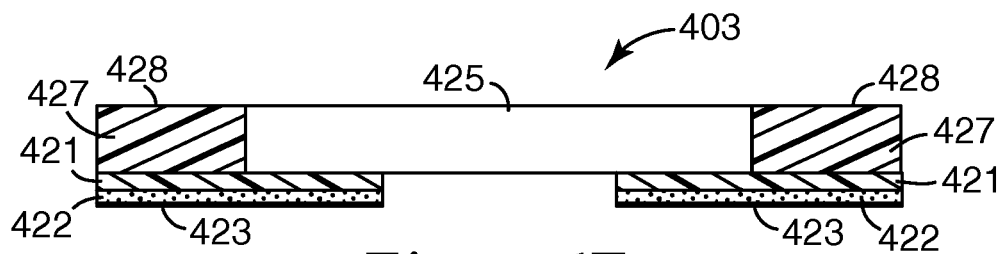

FIGS. 4D and 4E illustrate embodiments of GIGs 402, 403 where the first gasket layer 421, having an adhesive layer 422 and optional adhesive liner 423, is positioned under the GDL 425. In the embodiments illustrated in FIGS. 4D and 4E, the second gasket layer 424,427 is disposed on the first gasket layer 421 adjacent the GDL 425. In some implementations, material of the second gasket layer 424,427 may overlap the top surface of the GDL 425. The second gasket layer 424,427 may include microstructured features 426 (FIG. 4D) or have a substantially flat sealing surface 428 (FIG. 4E).

In some embodiments, the GIG is assembled by placing or depositing the heat/pressure processable gasket material used to form the second gasket layer on the first gasket layer prior to arrangement of the GDLs on the first gasket layer. For example, the heat/pressure processable gasket material may be screen printed or otherwise deposited on the surface of the first gasket layer. The GDL is then positioned over the first gasket layer. In some implementations, a portion of the gasket material of the second gasket layer may be disposed between the GDL and the first gasket layer. After placement of the GDL, heat and/or pressure are applied to the subassembly, causing some of the heat/pressure processable material to flow into an adjacent edge and/or surface of the GDL and into an adjacent edge and/or surface of the first gasket layer.

Figure 4F:
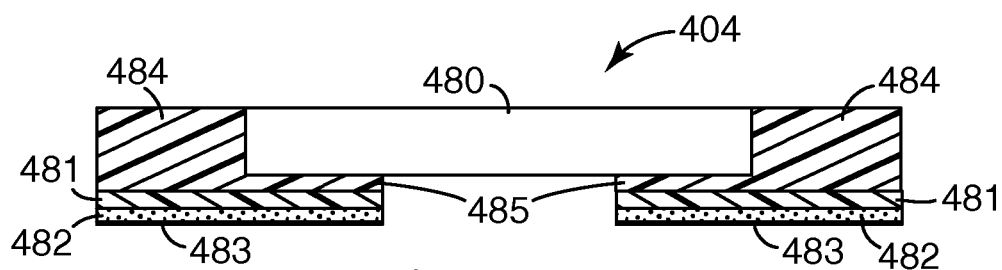
FIG. 4F is a cross sectional view of a GIG where a portion of the heat/pressure processable material used for the second gasket layer is disposed between the first gasket layer and the GDL in accordance with embodiments of the invention.

FIG. 4F illustrates a GIG 404 that may be formed according the above-described process. In this implementation, some of the heat/pressure processable material 485 of the second gasket layer is disposed between the GDL 480 and the first gasket layer 481. The first gasket layer 481 includes an adhesive layer 482 and optional adhesive liner 483. The second gasket layer 484 may include microstructured features, or may be substantially flat, as illustrated in FIG. 4F.

Figure 5A:
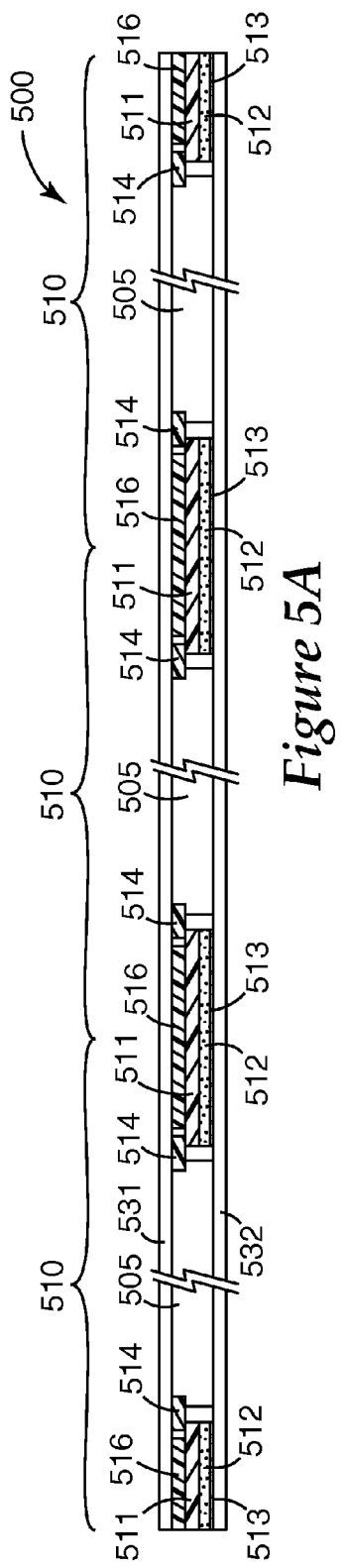
FIG. 5A is a cross sectional view of a GIG subassembly web comprising a plurality of GIGs sandwiched between first and second carrier webs formed in accordance with one embodiment.

A web comprising a plurality of GIGs, such as those illustrated in FIGS. 4A-4F, may be fabricated as a GIG subassembly web in a roll-to-roll process. FIG. 5A illustrates a cross sectional view of GIG web 500 comprising a plurality of GIGs 510 similar to the GIGs illustrated in FIGS. 4A-4C. To facilitate handling and transport the GIG subassembly components, the heat/pressure processable material that forms the second gasket layer 514 may be disposed on a first carrier web 531 and the first gasket layer may be disposed on a second carrier web 532 during the fabrication process.

Figure 5B:
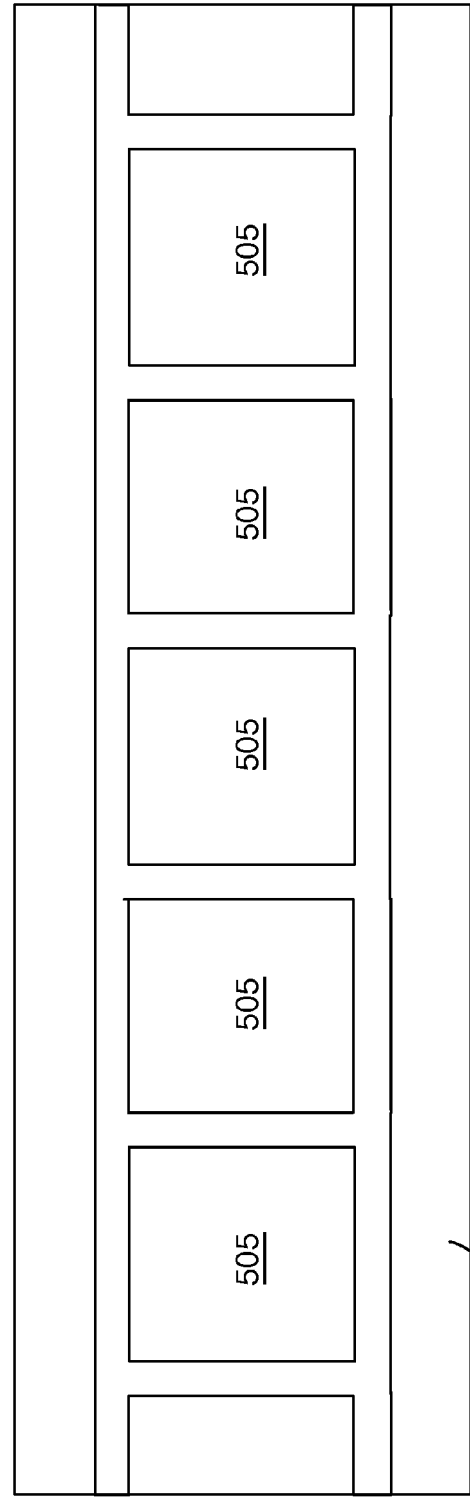
FIG. 5B is a plan view of the GIG subassembly web of FIG. 5A absent the second carrier web.

During fabrication, the heat/pressure processable material that forms the second gasket layer 514 is brought together with the first gasket material 511 and GDLs 505 at a compression device, such as a pair of bonding rollers, through movement of the first and second carrier webs 531, 532. At the bonding rollers, heat and/or pressure are applied to the heat/pressure processable material causing the material to flow or deform, forming the second gasket layer 514 which bonds the first gasket material 511 to the GDLs 505. Each GIG may or may not include microstructured features 516. An adhesive layer 512 and optional adhesive liner 513 are disposed on the first gasket layer 511. FIG. 5B illustrates in plan view (not to scale) of a GIG subassembly web including the second carrier web 532 and absent the first carrier web 531 illustrated in FIG. 5A.

Figure 5C:
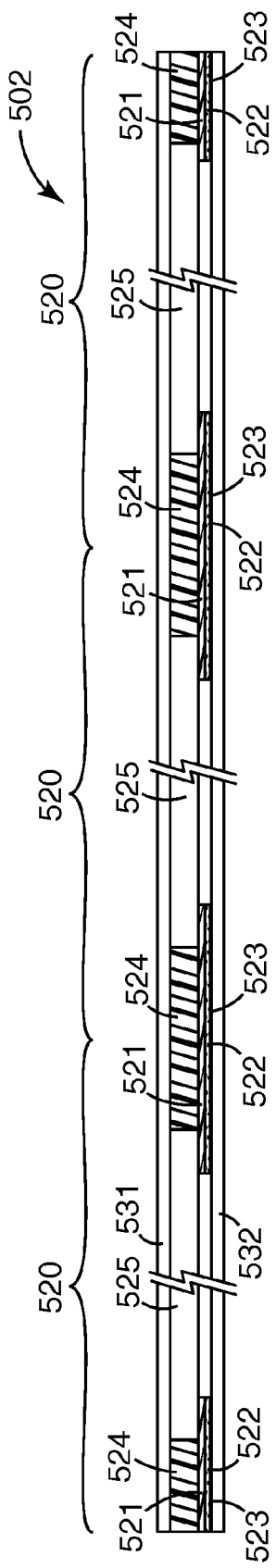
FIG. 5C is a cross sectional view of a GIG subassembly web comprising a plurality of GIGs sandwiched between first and second carrier webs where the GDL overlaps the first gasket layer in accordance with one embodiment.

A web comprising a plurality of GIGs, such as those illustrated in FIGS. 4D-4E, is illustrated in FIG. 5C. FIG. 5C illustrates a cross sectional view of GIG web 502 comprising a plurality of GIGs 520 in accordance with one embodiment. To facilitate handling and transport the GIG subassembly components, the heat/pressure processable material that forms the second gasket layer 524 may be disposed on a first carrier web 531 and the first gasket layer may be disposed on a second carrier web 532 during the fabrication process prior to bonding.

During fabrication, the heat/pressure processable material that forms the second gasket layer 524 is brought together with the first gasket material 521 and GDLs 525 at a compression device, such as a pair of bonding rollers, through movement of the first and second carrier webs 531, 532. At the bonding rollers, heat and/or pressure are applied to the heat/pressure processable material causing the material to flow or deform, forming the second gasket layer 524 which bonds the first gasket material 521 to the GDLs 525. An adhesive layer 522 and optional adhesive liner 523 are disposed on the first gasket layer 521.

Figure 6A:
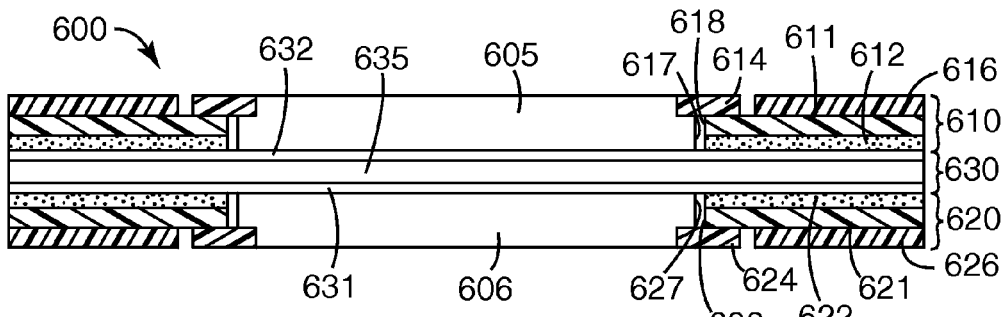
FIG. 6A illustrates a membrane electrode assembly (MEA) including GIGs disposed on first and second surfaces of a catalyst coated electrolyte membrane (CCM) in accordance with embodiments of the invention.
Figure 6B:
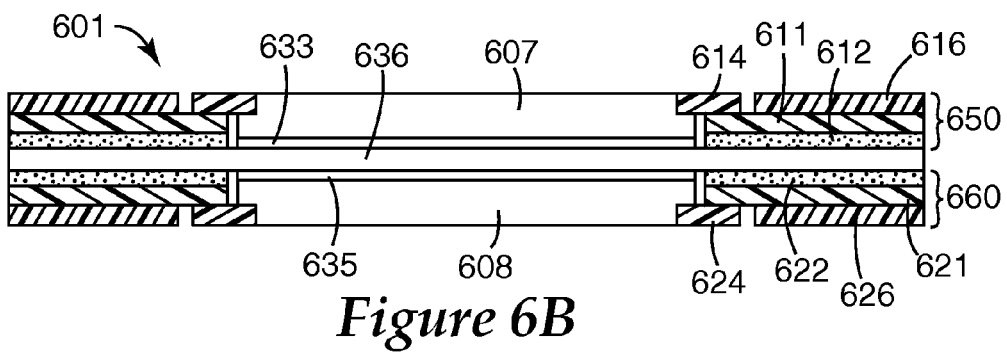
FIG. 6B illustrates an MEA including GIGs having catalyst coated GDLs disposed on an electrolyte membrane without catalyst layers in accordance with embodiments of the invention.

In certain embodiments, GIGs and/or GIG subassembly webs fabricated according to the processes described above and depicted in FIGS. 4A-5C may be used in subsequent processes to form MEAs or MEA subassembly webs. FIGS. 6A and 6B illustrate MEAs fabricated using GIGs disposed on first and second surfaces of a catalyst coated electrolyte membrane. FIG. 6A illustrates GIGs 610, 620 disposed on first and second surfaces of a catalyst coated electrolyte membrane (CCM) 630. Each GIG 610, 620 includes a first gasket layer 611, 621 that may include microstructured features 616, 626. An adhesive layer 612, 622 is disposed on each of the first gasket layers 611, 621. Each of the first gasket layers 611, 621 of GIGs 610, 620 have apertures with GDLs 605, 606 arranged within the apertures.

The GDLs 605, 606 illustrated in FIG. 6A are slightly smaller than the apertures of the first gasket layers 611, 621 so that the GDLs 605, 606 fit within the apertures of first gasket layers 611, 621. In some embodiments, the GDLs 605, 606 may be slightly larger than the apertures of the first gasket layers 611, 621 so that outer edges 617, 627 of the GDLs 605, 606 overlap the inner edges 618, 628 of the first gasket layers

611, 621. Each GIG includes a second gasket layer 614, 624 formed from a heat/pressure processable material.

After application of heat and/or pressure, the heat/pressure processable material flows to form the second gasket layer 614, 624 that bonds the first gasket layer 611, 621 and the GDL 605, 606. During the bonding process, microstructured features may be imparted to the second gasket layer 614 and/or the first gasket layer 611 to enhance the sealing properties of the GIG 601.

FIG. 6B illustrates an MEA 601 similar to the MEA illustrated in FIG. 6A, except that the GIGS 650, 660 of FIG. 6B include catalyst layers 633, 635 on the surfaces of the GDLs 607, 608. In this embodiment, the electrolyte membrane 636 may or may not include catalyst layers.

Figure 6C:
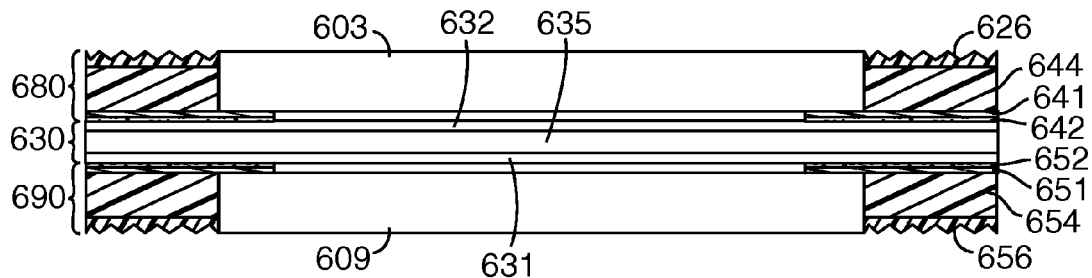
FIG. 6C illustrates a membrane electrode assembly (MEA) including GIGs wherein the GDLs overlap the first gasket layer of the GIGs in accordance with embodiments of the invention.

FIG. 6C illustrates GIGs 680, 690 disposed on first and second surfaces of a catalyst coated electrolyte membrane (CCM) 630 having a membrane 635 and catalyst layers 631, 632. Each GIG 680, 690 includes a first gasket layer 641, 651. An adhesive layer 642, 652 is disposed on each of the first gasket layers 641, 651. In this embodiment, the GDLs 603, 609 overlap the first gasket layers 641, 651. Each GIG 680, 690 includes a second gasket layer 644, 654 formed from a heat/pressure processable material. In this embodiment, the second gasket layers 644, 654 include microstructured features 626, 656.

Figure 7:
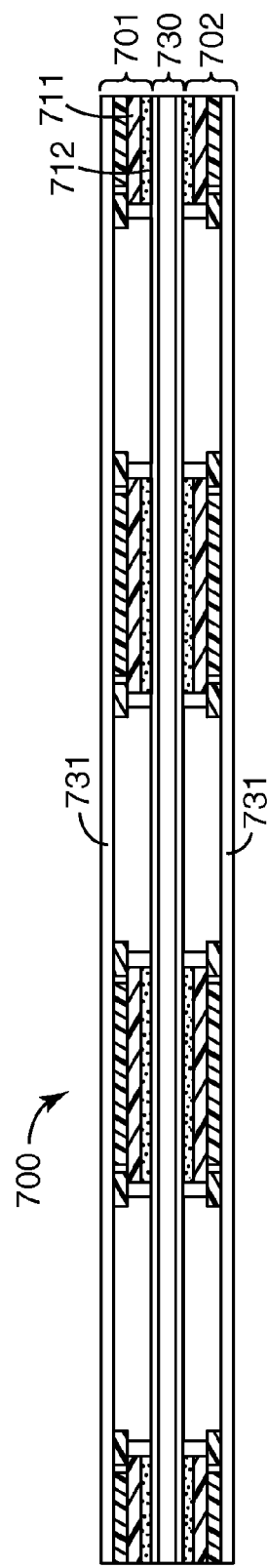
FIG. 7 is a cross sectional view of an MEA web formed in accordance with an embodiment of the invention.

FIG. 7 illustrates a cross sectional view of an MEA subassembly web 700 comprising a plurality of MEAs which may be fabricated by a roll-to-roll manufacturing process in accordance with one embodiment. The MEA subassembly web 700 may be fabricated using two GIG subassembly webs as illustrated in FIG. 5A, following removal of the second carrier web from each GIG subassembly. Following removal of the second carrier web and the adhesive liner, if used, one of the GIG subassemblies 701 is adhesively bonded to one surface of the CCM 730 via the adhesive layer 712 of the first gasket layer 711. Another of the GIG subassemblies 702 is adhesively bonded to the opposite surface of the CCM 730 to form the MEA subassembly web 700. The process leaves the first carrier webs 731 of each of the GIG subassemblies webs 701, 702 intact which may facilitate handling of the MEA subassembly web 700 in subsequent processing steps.

Figure 8:
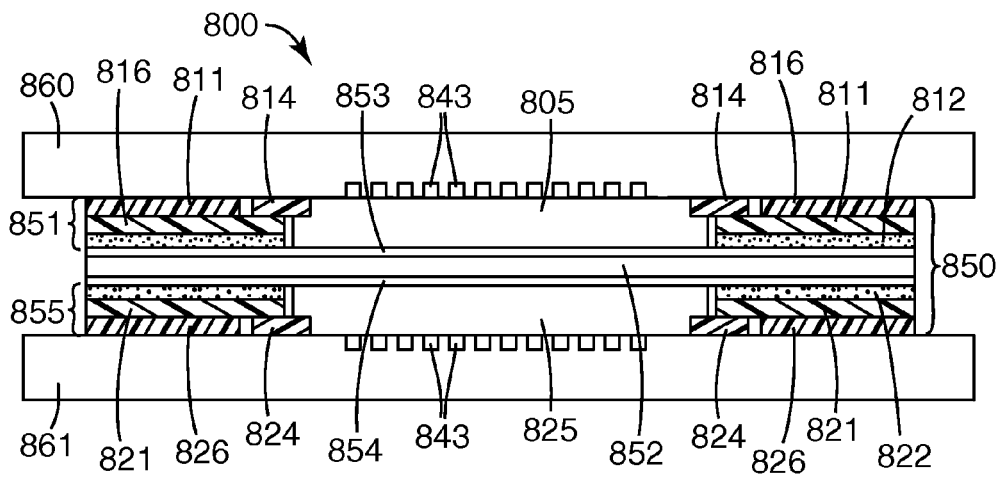
FIG. 8 is a single fuel cell including an MEA incorporating GIGs in accordance with an embodiment of the invention.

Referring now to FIG. 8, there is illustrated a cross sectional view of a single cell assembly of a fuel cell stack 800 in accordance with an embodiment of the invention. The fuel cell stack comprises a five layer MEA 850, incorporating two GIGs 851, 855 as described above, sandwiched between fluid flow plates 860, 861.

Fabrication of fuel cells including MEAs and flow field plates may be accomplished by a roll to roll process. Methods and devices useful in roll to roll fuel cell fabrication, including flow field separator plates suitable for roll to roll processing, are described in commonly owned U.S. Patent Publication No. 20060141328 which is incorporated herein by reference in its entirety.

The MEA 850 of the fuel cell 800 includes an electrolyte membrane 852 between anode 853 and cathode 854 catalyst layers. In some configurations, one or both of the anode 853 and cathode 854 catalyst layers may be disposed on the surfaces of the electrolyte membrane 852 forming a catalyst coated membrane (CCM). In other configurations, as previously illustrated in FIG. 6B, the catalyst layers 853, 854 may be disposed on the surface of the GDLs 805, 825. In yet other configurations, the catalyst layers 853, 854 may be disposed partially on the electrolyte membrane 852 and partially on the GDLs 805, 825.

The anode and cathode catalyst layers 853, 854 are disposed between the electrolyte membrane 852 and GIGs 851, 855 configured as described herein. Each GIG 851, 855 includes a GDL 805, 825 a first gasket layer 811, 821 adhesive layer 812, 822 and second gasket layer 814, 824 that bonds the first gasket layer 811, 821 to the GDL 805, 825. Prior to assembly of the gasketed MEA 850 the GIGs 851, 855 optionally include an adhesive liner that is removed during assembly of the MEA 850. After removal of the adhesive liner, the adhesive layers 812, 822 of the GIGs 851, 855 adhere to the surfaces of the CCM and/or in some configurations to each other to form the gasketed MEA 850.

In the example provided in FIG. 8, the first gasket layer 811, 821 and/or the second gasket layer 814, 824 of the GIGs 851, 855 include optional microstructured features 816, 826 to facilitate sealing between the GIG 851, 855 and the fuel flow plates 860, 861. Each of the flow field plates 860, 861 includes a field of gas flow channels 843 and ports through which hydrogen and oxygen fuels pass. In the configuration depicted in FIG. 8, flow field plates 860, 861 are configured as monopolar flow field plates. In other configurations, the flow field plates 860, 861 may comprise bipolar fluid flow plates to facilitate stacking multiple MEAs to achieve a desired voltage across the fuel cell stack.

Any suitable electrolyte membrane may be used in the practice of the present invention. Useful PEM thicknesses range between about 200 µm and about 15 µm. Copolymers of tetrafluoroethylene (TFE) and a co-monomer according to the formula: FSO2-CF2-CF2-O—CF(CF3)-CF2-O—CF=CF2 are known and sold in sulfonic acid form, i.e., with the FSO2- end group hydrolyzed to HSO3-, under the trade name NAFION® by DuPont Chemical Company, Wilmington, Del. NAFION® is commonly used in making polymer electrolyte membranes for use in fuel cells. Copolymers of tetrafluoroethylene (TFE) and a co-monomer according to the formula: FSO2-CF2-CF2-O—CF=CF2 are also known and used in sulfonic acid form, i.e., with the FSO2-end group hydrolyzed to HSO3-, in making polymer electrolyte membranes for use in fuel cells. Most preferred are copolymers of tetrafluoroethylene (TFE) and FSO2-CF2CF2CF2CF2-O—CF=CF2, with the FSO2-end group hydrolyzed to HSO3-. Other materials suitable for PEM construction are described in commonly owned U.S. patent application Ser. No. 11/225690 filed on Sep. 13, 2005 which is incorporated herein by reference.

In some embodiments, the catalyst layers may comprise Pt or Pt alloys coated onto larger carbon particles by wet chemical methods, such as reduction of chloroplatinc acid. This form of catalyst is dispersed with ionomeric binders, solvents, and often polytetrafluoroethylene (PTFE) particles to form an ink, paste, or dispersion that is applied either to the membrane or the GDLs.

In some embodiments, the catalyst layers may comprise nanostructured support elements bearing particles or nanostructured thin films (NSTF) of catalytic material. Nanostructured catalyst layers do not contain carbon particles as supports and therefore may be incorporated into very thin surface layers of the electrolyte membrane forming a dense distribution of catalyst particles. The use of NSTF catalyst layers allows much higher catalyst utilization than catalyst layers formed by dispersion methods, and offer more resistance to corrosion at high potentials and temperatures due to the absence of carbon supports. In some implementations, the catalyst surface area of a CCM may be further enhanced by embossing microstructured features onto an electrolyte membrane. The NSTF catalyst is coated onto a microstructured catalyst transfer substrate which upon lamination transfer of catalyst to the electrolyte membrane under heat and pressure causes the electrolyte membrane's surface to be micro-replicated. Methods and systems directed to microstructured catalyst transfer substrates are described in commonly owned U.S. Pat. No. 6,136,412 which is incorporated herein by reference. Various methods for making microstructured electrolyte membranes and NSTF catalyst layers are described in the following commonly owned patent documents which are incorporated herein by reference: U.S. Pat. Nos. 4,812,352 and 5,879,827, and U.S. patent application Ser. No. 11/225, 690 filed on Sep. 13, 2005 and U.S. patent application Ser. No. 11/224,879 filed on Sep. 13, 2005.

NSTF catalyst layers comprise elongated nanoscopic particles that may be formed by vacuum deposition of catalyst materials on to acicular nanostructured supports. Nanostructured supports suitable for use in the present invention may comprise whiskers of organic pigment, such as C.I. PIGMENT RED 149 (perylene red). The crystalline whiskers have substantially uniform but not identical cross-sections, and high length-to-width ratios. The nanostructured support whiskers are coated with coating materials suitable for catalysis, and which endow the whiskers with a fine nanoscopic surface structure capable of acting as multiple catalytic sites.

In certain implementations, the nanostructured support elements may be extended through continued screw dislocation growth. Lengthening and/or increasing the density of the nanostructured support elements allows for an increased surface area for catalysis. Processes for lengthening the nanostructured support elements are described in previously incorporated U.S. patent application Ser. No. 11/225,690. Additionally, or alternatively, multiple layers of nanostructured support elements also provide for an increased surface area. Processes for producing multiple layers of nanostructured support elements are described in previously incorporated U.S. patent application Ser. No. 11/224,879. The nanostructured support elements are coated with a catalyst material to form a nanostructured thin film catalyst layer. According to one implementation, the catalyst material comprises a metal, such as a platinum group metal. In one embodiment, the catalyst coated nanostructured support elements may be transferred to a surface of an electrolyte membrane to form a catalyst coated membrane. In another embodiment, the catalyst coated nanostructured support elements may be formed on a GDL surface.

The GDLs can be any material capable of collecting electrical current from the electrode while allowing reactant gasses to pass through, typically a woven or non-woven carbon fiber paper or cloth. The GDLs provide porous access of gaseous reactants and water vapor to the catalyst and membrane, and also collect the electronic current generated in the catalyst layer for powering the external load.

GDLs may be any suitable electrically conductive porous substrate, such as carbon fiber constructions (e.g., woven and non-woven carbon fiber constructions). Examples of commercially available carbon fiber constructions include trade designated "AvCarb P50" carbon fiber paper from Ballard Material Products, Lowell, Mass.; "Toray" carbon paper which may be obtained from ElectroChem, Inc., Woburn, Mass.; "SpectraCarb" carbon paper from Spectracorp, Lawrence, Mass.; "AFN" non-woven carbon cloth from Hollingsworth & Vose Company, East Walpole, Mass.; and "Zoltek" carbon cloth from Zoltek Companies, Inc., St. Louis, Mo., and "U-105" carbon cloth from Mitsubishi Rayon Co., Tokyo, Japan. GDLs may also be treated to increase or impart hydrophobic properties. For example, GDLs may be treated with highly-fluorinated polymers, such as polytetrafluoroethylene (PTFE) and fluorinated ethylene propylene (FEP).

Figure 9A:
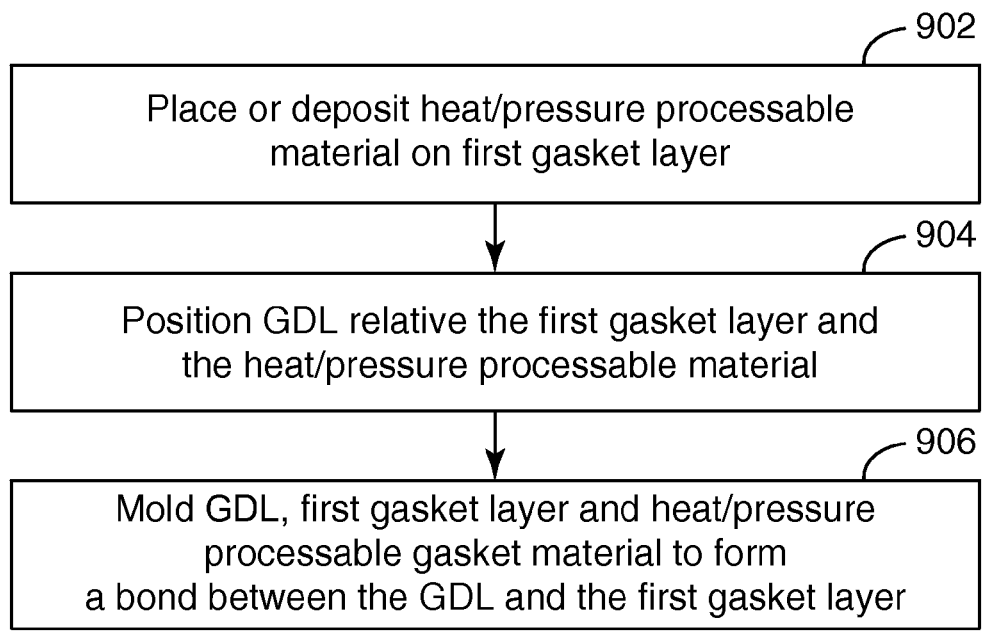
FIGS. 9A and 9B are diagrams illustrating processes for making a GIG in accordance with embodiments of the invention.

FIG. 9A illustrates a process for making a GIG in accordance with an embodiment of the invention. The process may be implemented for individual GIGs or for multiple GIGs formed as a roll good. A heat and/or pressure processable material is placed or deposited 902 on a first gasket layer which includes an adhesive layer and an optional adhesive liner. For example, the heat/pressure processable material may be silk screen printed or deposited by other methods on the surface of the first gasket layer before or after one or more apertures are cut into the first gasket layer. The deposition of the heat/pressure processable material may be performed so that the heat/pressure processable material has a thickness gradient across the surface of the first gasket layer. GDLs are positioned 904 relative to the first gasket layer so that they overlap the edges of the first gasket layer apertures and some of the heat/pressure processable material is disposed between the first gasket layer and the GDL. The thickness of the heat/pressure processable material under the GDL may have a thickness that is less than the thickness of the heat/processable material elsewhere on the first gasket layer, for example. The subassembly including the GDL, the first gasket layer and the heat/pressure processable material is molded 906 at a bonding station. The heat/pressure processable material deforms or flows to form a second gasket layer that bonds the first gasket layer to the GDL.

Figure 9B:
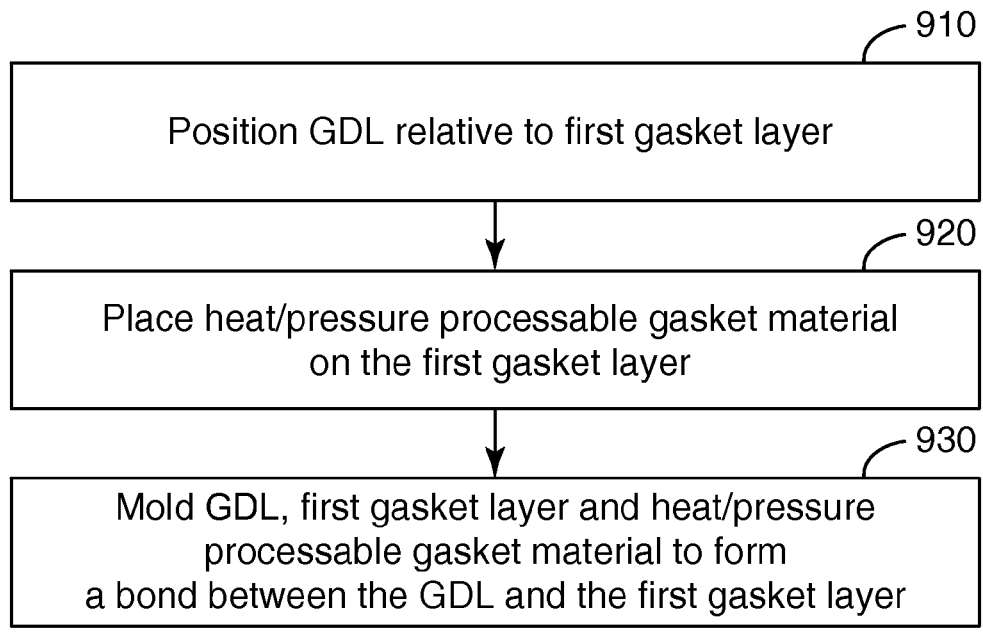

FIG. 9B is a diagram illustrating a process for making a GIG in accordance with another embodiment. A GDL is positioned 910 relative to an edge of a first gasket layer. For example, the GDL may be positioned relative to an inner edge of the first gasket layer, the inner edge framing an aperture in the first gasket layer. The first gasket layer includes an adhesive layer on one surface and, optionally, an adhesive liner. A gasket material that flows or deforms due to heat and/or pressure is placed 920 on the surface of the first gasket layer opposite the adhesive layer and/or on the mold plate. The GDL, first gasket layer, and gasket material are placed in a mold and molded 930. The molding process forms a second gasket layer from the gasket material and bonds the GDL and the first gasket layer. In some configurations, the gasket material comprises a heat/pressure processable polymer die cut to lay over the adjoining edges of the GDL and first gasket layer. In some configurations, microstructured features are embossed on the surface of the second gasket layer and/or the first gasket layer during the molding process.

Turning now to FIGS. 10A-10G there are shown a number of illustrations depicting various processing stages wherein a GIG is constructed from constituent material layers in accordance with embodiments of the invention. As shown in the cross sectional view of FIG. 10A, a first gasket layer 1011 is die cut to have an aperture 1060 slightly larger than the size of a GDL. The first gasket layer 1011 may comprise PEN, PET, polyimide, or other suitable polymer. The first gasket layer 1011 has an adhesive layer 1012 and an optional adhesive liner 1013. For example, in one implementation, the first gasket layer may have a thickness of about 0.125 mm, the adhesive layer may have a thickness of less than about 0.0125 mm, and the adhesive liner may have a thickness of about 0.025 mm.

Figure 10A:
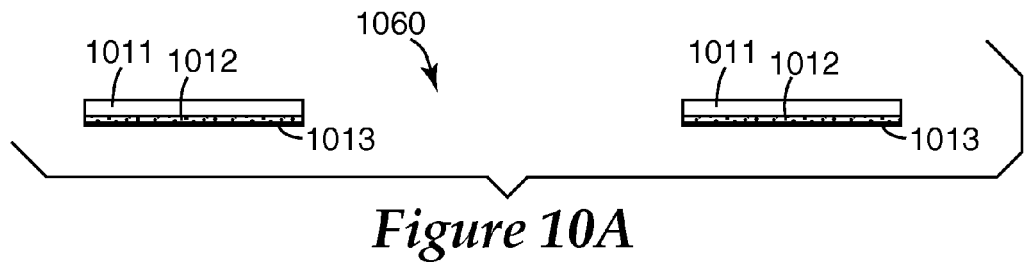
FIGS. 10A-10G are a series of diagrams illustrating a process for making a GIG in accordance with embodiments of the invention.
Figure 10B:
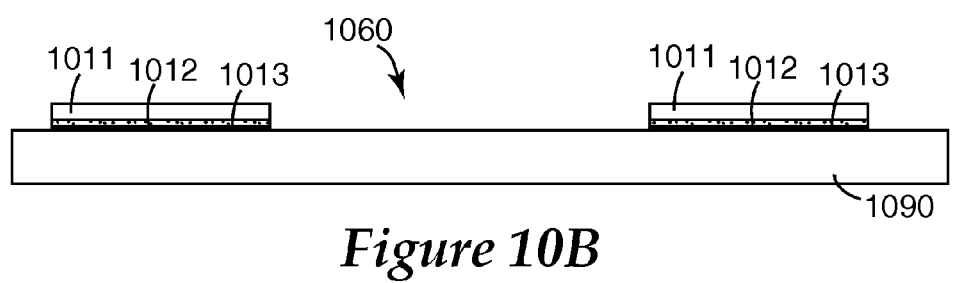
Figure 10C:
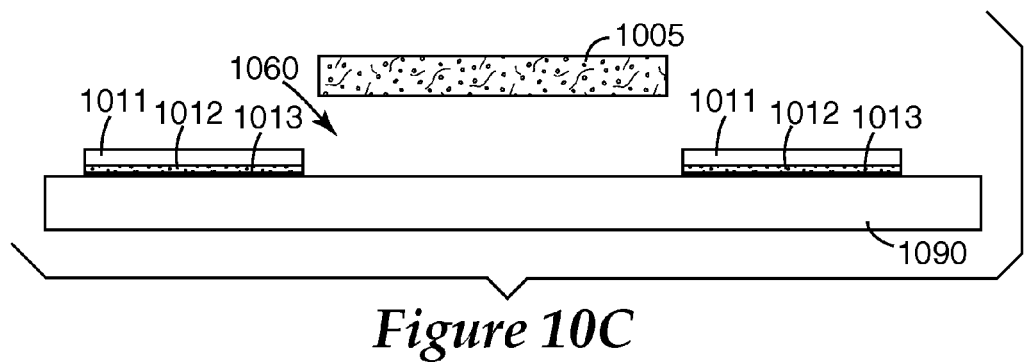
Figure 10D:
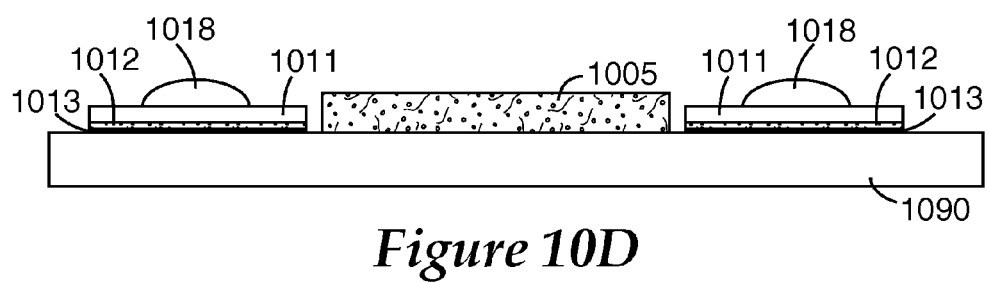
Figure 10E:
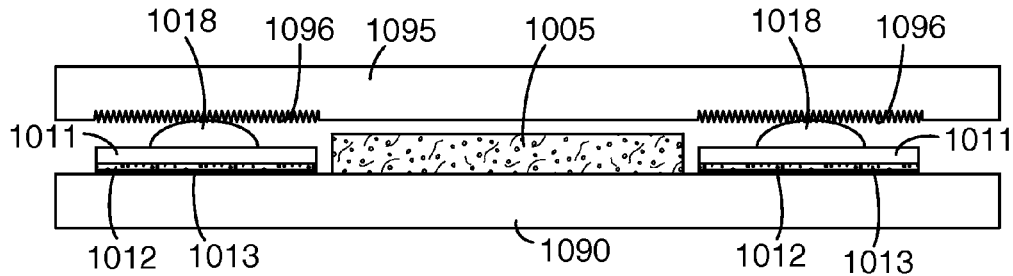
Figure 10F:
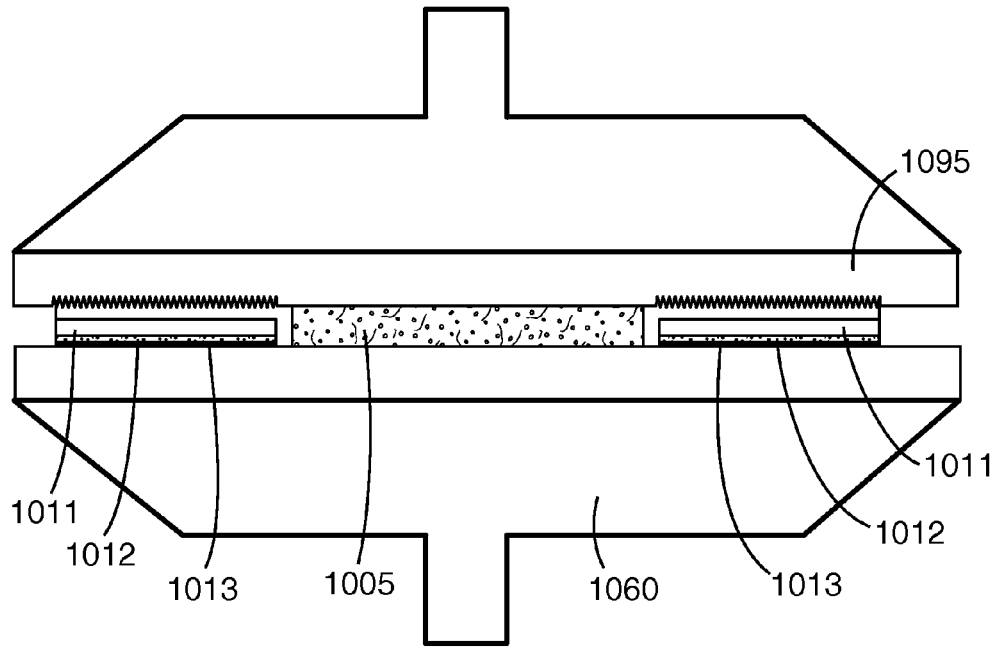

The die-cut first gasket layer/adhesive/liner 1011-1013 is placed, adhesive liner 1013 side down, onto a flat plate 1090 having a release coating or liner to which the GDL and the material of the second gasket layer, e.g., silicone, do not adhere (FIG. 10B). A GDL 1005 is installed into the aperture of the first gasket layer, as depicted in FIG. 10C. In one configuration, a bead 1018 of flowable, curable gasket material, such as silicone is placed on the free surface of the first gasket layer 1011 (FIG. 10D). A mold plate 1095 is installed on top of the above subassembly (FIG. 10E). The mold plate 1095 has a release coating that prevents the material of the flowable gasket material from adhering. The mold plate 1095 may incorporate a microstructured patterned surface 1096 corresponding to the area of the first gasket layer 1011. The mold plate 1095 may have a recess of a specific depth, e.g., about 0 to about 0.250 mm, to accommodate some fraction of the height of the GDL 1005.

Figure 10G:
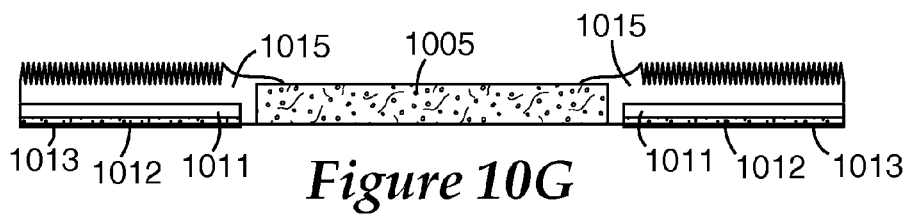

The above subassembly is installed into a press and is molded (FIG. 10F) under heat and pressure, for example, about 25 to about 30 tons at about 60° C. to about 150° C., for about 2 to about 10 minutes, allowing the silicone to flow and the GIG to reach the desired thickness. The silicone is allowed to cure, forming the second gasket layer 1015. FIG. 10G illustrates the GIG after removal from the press 1060. The steps described may be performed in any suitable order.

Figure 11E:
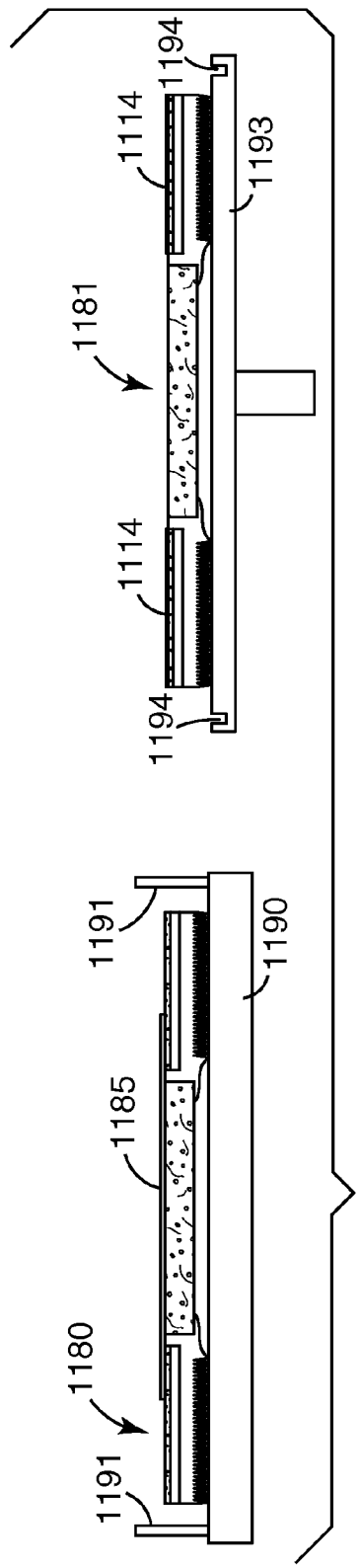
Figure 11F:
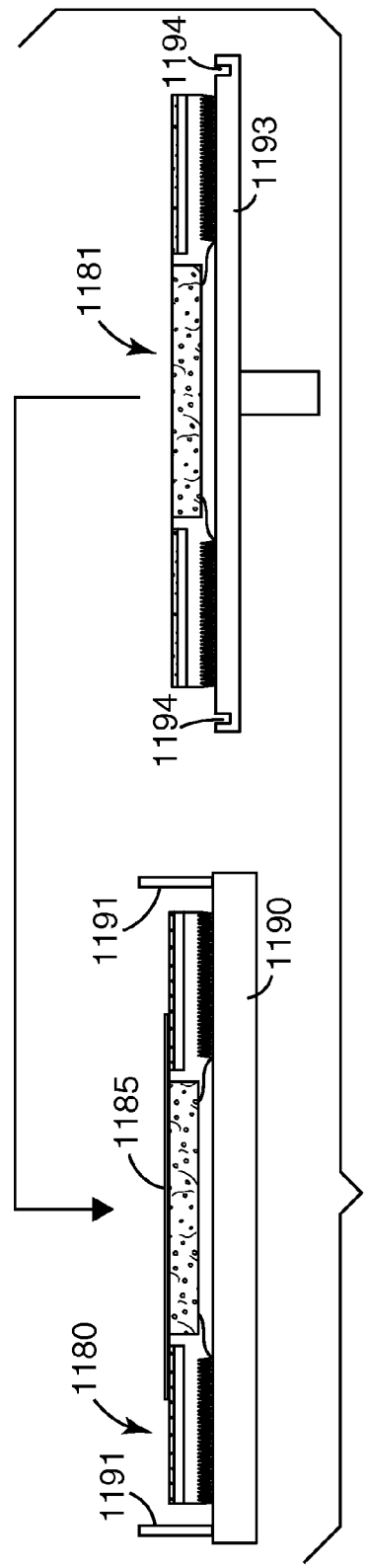
Figure 11G:
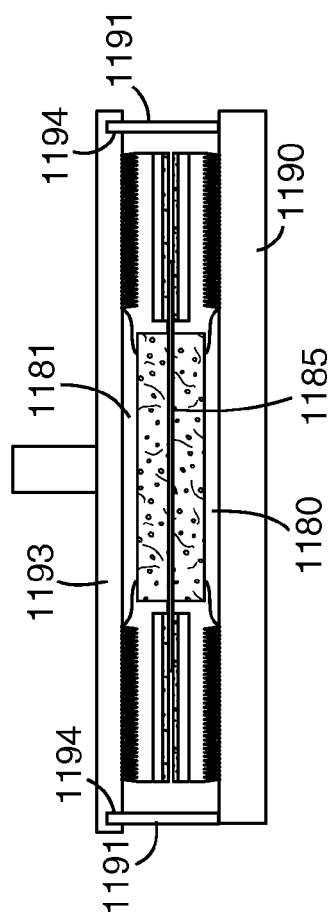

FIGS. 11A-11H show a number of diagrams illustrating a process for making an MEA incorporating a GIG in accordance with embodiments of the present invention. FIG. 11A illustrates a first GIG 1180 that has been placed on a vacuum table 1190 having alignment pins 1191 configured to facilitate positioning of the various layers of the multilayer MEA. The microporous layer of the first GIG 1180 faces upwards. Vacuum is applied to hold the first GIG 1180 in place. The adhesive liner 1113 is removed from the first GIG 1180, as illustrated in FIG. 11B.

FIG. 11C illustrates a CCM 1185 that has been placed onto a vacuum plate 1193, which has appropriate alignment features 1194 to engage with pins 1191 of the vacuum table 1190. Vacuum is applied to the vacuum plate 1193, holding the CCM 1185 in place. The vacuum plate 1193 holding the CCM 1185 is placed on top of the vacuum table 1190/first GIG 1180, aligning the pins 1191 and features 1194 to provide accurate mating of the first GIG 1180 and CCM 1185 layers, as illustrated in FIG. 11D. The vacuum is removed from the vacuum plate 1193 and the vacuum plate 1193 is removed, leaving the CCM 1185 adhesively attached to the first GIG 1180.

Figure 11H:
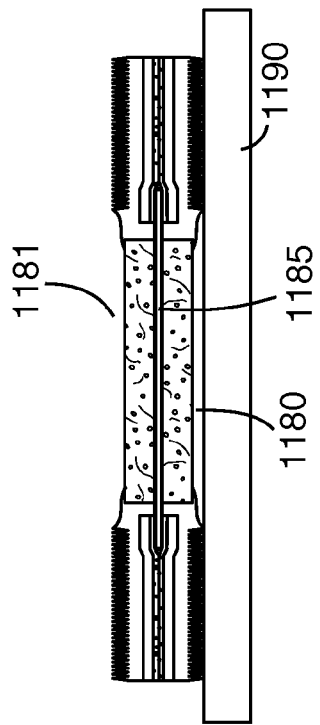

A second GIG 1181 is placed in the vacuum plate 1193, microporous layer side up, as depicted in FIG. 11E. Vacuum is applied to hold the second GIG 1181 in place. The adhesive liner 1114 is removed from the second GIG 1181. The vacuum plate 1193/second GIG 1181 is placed on top of the CCM 1185/first GIG 1180 assembly on the vacuum table 1190, illustrated in FIG. 11G. The vacuum is removed from the vacuum plate 1193 and the plate 1193 is removed leaving the second GIG 1181/CCM 1185/first GIG 1180 MEA assembly, as illustrated in FIG. 11H. The MEA is removed from the vacuum table 1190 and may be die cut to set the outer dimensions of the part.

In some embodiments, GIGs configured in accordance with embodiments described herein may be fabricated via continuous and/or roll-to-roll processes described in commonly owned U.S. Patent Application identified by Attorney Docket No. 62591US002 filed concurrently with the present application and incorporated herein by reference.

The GIGs configured in accordance with the embodiments presented herein provides numerous advantages over prior gasketing approaches. Prior processes require the MEA and GDLs to be exposed to higher than desirable temperatures and pressures required for gasket formation or for bonding fuel cell components (e.g., bonding a GDL to a CCM, or bonding a catalyst coated GDL to an electrolyte membrane). Exposure to high temperatures and pressures during the manufacturing process may lead to electronic shorting of the GDLs through the CCM. The GIGs as described herein may be manufactured using temperatures in excess of those tolerable by the CCM. The use of GIGs of the present invention spares the CCM from exposure to these excessive temperatures, thus allowing for potentially faster cycle times in the slow gasket making procedure. The speed of the curing procedure depends upon the specific material used. In addition, curing of gasket materials, such as silicone, may release species that are detrimental to the CCM. Use of the GIGs as described herein does not expose the CCM to the gasket curing process.

The use of GIGs as described herein may be used to minimize scrapping the CCM during the manufacturing process. Forming the GIGs first and then attaching them to the CCM means that any failures in the gasket making process does not lead to waste of the more expensive CCM.

Prior gasketing approaches require that the gasket layer, e.g., PEN, PET, or other polymer, bonds well to the CCM. Insufficient bonding results in leaks that occur when the MEA is placed under operating conditions. Insufficient bonding also leads to difficulty in handling subassemblies during manufacture and stack assembly processes if the gasket fails to adhere and falls off the electrolyte membrane. The gasketing approaches described herein provide enhanced bonding at the GIG/CCM interface and are particularly advantageous when nanostructured thin film catalyst layers are used.

In addition, some prior gasketing approaches require that the gasketed CCM be cut to the same size as the final outer dimensions of the part to allow for adequate sealing area and for sufficient gasket-to-CCM bonding area. The approaches of the present invention allow the CCM to be cut only slightly larger than the GDL, just large enough to prevent reactant crossover from one electrode to the other in this region. The approaches described herein advantageously reduce the amount of expensive catalyst coated membrane required.

Prior approaches for incorporating MEAs into a fuel cell stack, where the MEAs did not include bonded GDLs, present difficulties due to the tight alignment tolerances required. The approaches described herein provide for easier MEA assembly where bonding of the GDLs is not possible or desirable.

Figure 12:
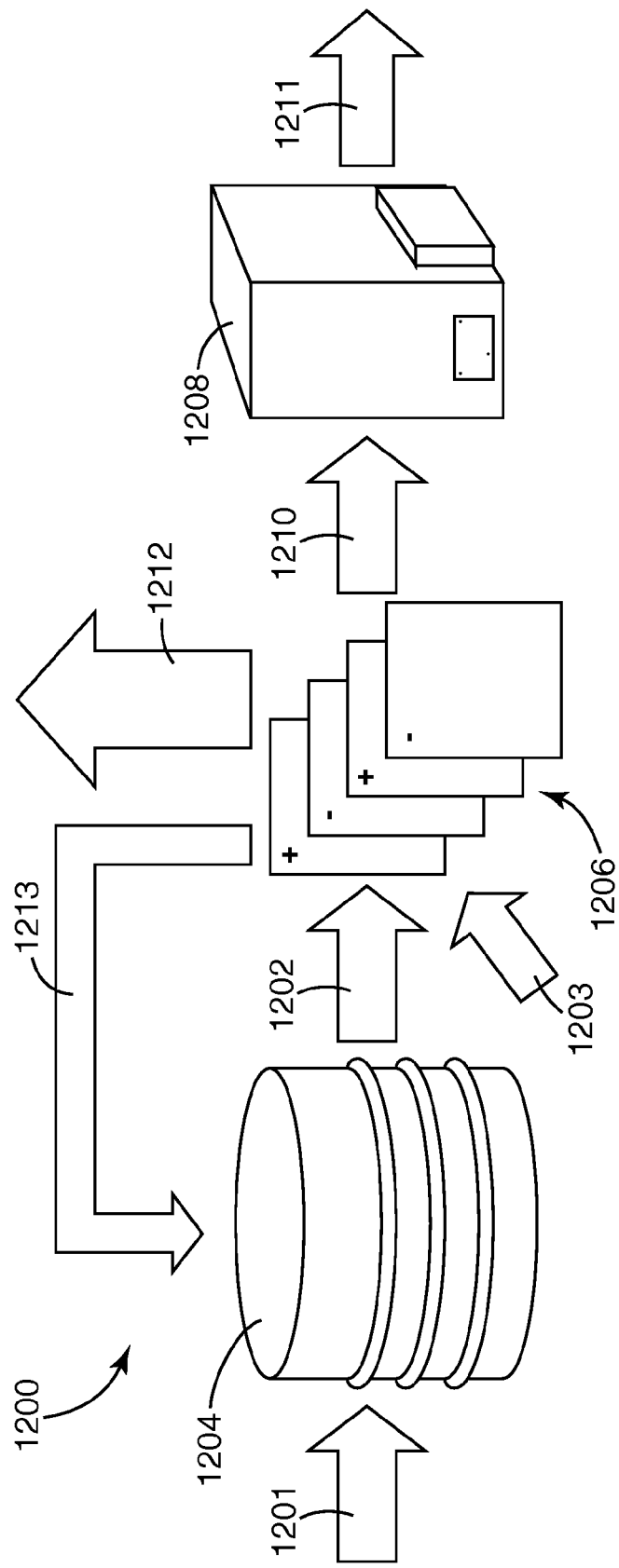
FIGS. 12-15 illustrate various fuel cell systems that may incorporate the GIGs described herein in accordance with various embodiments.

FIGS. 12-15 illustrate various fuel cell systems that may incorporate the fuel cell assemblies described herein and use a fuel cell stack for power generation. The fuel cell system 1200 shown in FIG. 12 depicts one of many possible systems in which a fuel cell assembly as illustrated by the embodiments herein may be utilized.

The fuel cell system 1200 includes a fuel processor 1204, a power section 1206, and a power conditioner 1208. The fuel processor 1204, which includes a fuel reformer, receives a source fuel 1201, such as natural gas, and processes the source fuel 1201 to produce a hydrogen rich fuel 1202. The hydrogen rich fuel 1202 is supplied to the power section 1206. Within the power section 1206, the hydrogen rich fuel 1202 is introduced into the stack of MEAs of the fuel cell stack(s) contained in the power section 1206. A supply of air 1203 is also provided to the power section 1206, which provides a source of oxygen for the stack(s) of fuel cells.

The fuel cell stack(s) of the power section 1206 produce DC power 1210, heat 1212, and clean water 1213. Polymer electrolyte membrane fuel cell systems may resupply product water 1213 to the fuel processor 1204, which makes a large fraction of its hydrogen from water and the rest from the methane or other fuel 1201. The DC power 1210 produced by the power section 1206 is transmitted to the power conditioner 1208, which converts DC power 1210 to AC power 1211 for subsequent use. It is understood that AC power conversion need not be included in a system that provides DC output power.

Figure 13:
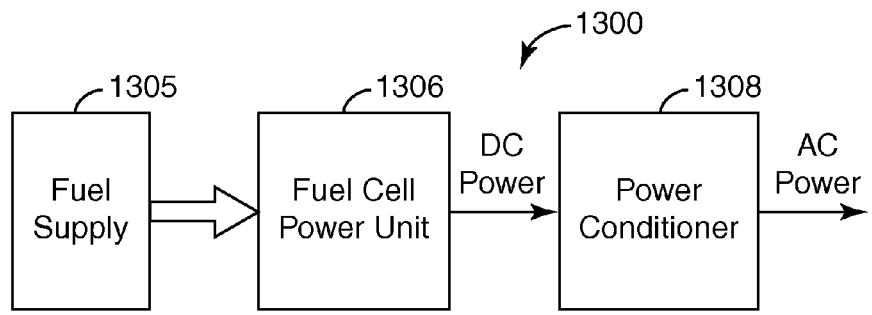

FIG. 13 illustrates a fuel cell power supply 1300 including a fuel supply unit 1305, a fuel cell power section 1306, and a power conditioner 1308. The fuel supply unit 1305 includes a reservoir containing hydrogen fuel that is supplied to the fuel cell power section 1306. Within the power section 1306, the hydrogen fuel is introduced along with air or oxygen into the MEAs of the fuel cell stack(s) contained in the power section 1306.

The power section 1306 of the fuel cell power supply system 1300 produces DC power, useable heat, and clean water. The DC power produced by the power section 1306 may be transferred to the power conditioner 1308, for conversion to AC power, if desired. The fuel cell power supply system 1300 illustrated in FIG. 13 may be implemented as a stationary or portable AC or DC power generator, for example.

Figure 14:
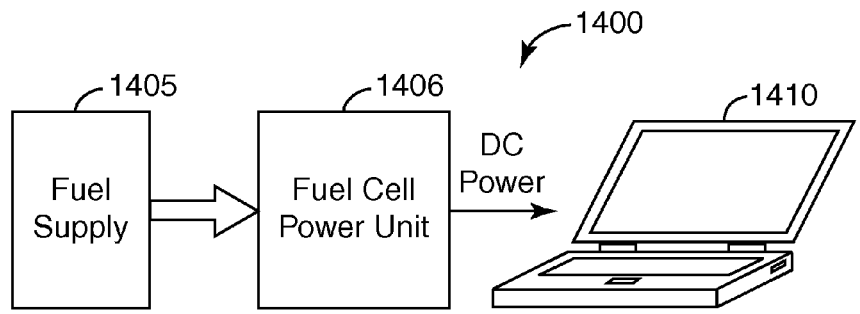

In the implementation illustrated in FIG. 14, a fuel cell system 1400 uses power generated by a fuel cell power supply to provide power to operate a computer. As described in connection with FIG. 8, fuel cell power supply system includes a fuel supply unit 1405 and a fuel cell power section 1406. The fuel supply unit 1405 provides hydrogen fuel to the fuel cell power section 1406. The fuel cell stack(s) of the power section 1406 produce power that is used to operate a computer 1410, such as a desk top or laptop computer.

Figure 15:
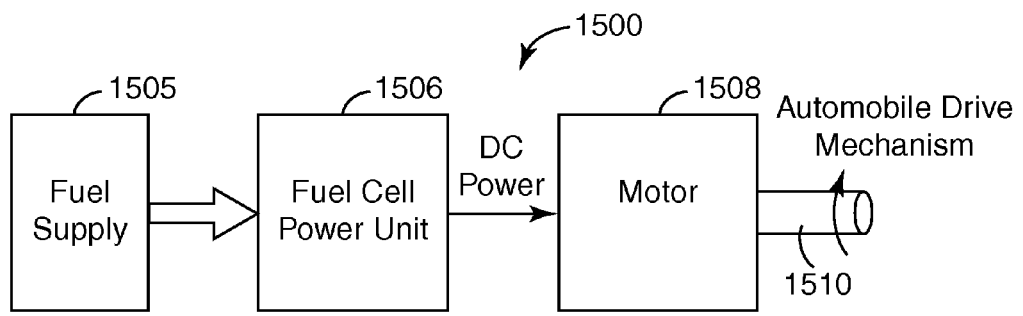

In another implementation, illustrated in FIG. 15, a fuel cell system 1500 uses power from a fuel cell power supply to operate an automobile. In this configuration, a fuel supply unit 1505 supplies hydrogen fuel to a fuel cell power section 1506. The fuel cell stack(s) of the power section 1506 produce power used to operate a motor 1508 coupled to a drive mechanism of the automobile 1510.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A subassembly for a fuel cell membrane electrode assembly (MEA), the subassembly consisting essentially of:
   a gas diffusion layer (GDL); and
   a gasket bonded to the GDL, the gasket comprising:
      a first gasket layer;
      a second gasket layer comprising a gasket material in contact with the first gasket layer and the GDL, the gasket material bonding the GDL to the first gasket layer; and
      an adhesive layer disposed on a surface of the first gasket layer which optionally includes a removable adhesive liner.

2. The subassembly of claim 1, wherein the gasket material of the second gasket layer penetrates the GDL.

3. The subassembly of claim 1, wherein the second gasket layer is disposed over a portion of a surface of the GDL.

4. The subassembly of claim 1, wherein the second gasket layer includes microstructured features on at least one surface.

5. The subassembly of claim 1, wherein the first gasket layer comprises a polymer.

6. The subassembly of claim 1, wherein the first gasket layer comprises PEN, PET or polyimide.

7. The subassembly of claim 1, wherein the gasket material comprises silicone, rubber, or fluoropolymer.

8. The subassembly of claim 1, wherein the gasket material comprises a material that is flowable or deformable under application of one or more of heat and pressure.

9. The subassembly of claim 1. wherein the GDL is disposed within an aperture of the first gasket layer.

10. The subassembly of claim 1, wherein the GDL overlaps the first gasket layer.

11. The subassembly of claim 10, wherein the GDL overlaps the second gasket layer.

12. The subassembly of claim 1, wherein the adhesive layer includes a removable adhesive liner.

13. The subassembly of claim 1, wherein the subassembly is a component of a roll good, the roll good comprising a plurality of similar subassemblies.

14. A membrane electrode assembly (MEA), comprising:
   first and second subassemblies, each consisting essentially of:
      a gas diffusion layer (GDL); and
      a gasket bonded to the GDL, the gasket comprising:
      a first gasket layer;
      a second gasket layer comprising a gasket material in contact with the first gasket layer and the GDL, the gasket material bonding the first gasket layer to the GDL; and
      an adhesive layer disposed on an opposite surface of the first gasket layer;
   an electrolyte membrane arranged between the first and second subassemblies;
   a first catalyst layer between the first subassembly and the membrane; and
   a second catalyst layer between the second subassembly and the membrane.

15. The MEA of claim 14, wherein the first and second catalyst layers comprise nanostructured thin film catalyst layers including nanoscopic particles of a catalyst material formed on acicular nanostructured supports.

16. The MEA of claim 14, wherein the membrane, the first catalyst layer and the second catalyst layer form a catalyst coated membrane.

17. The MEA of claim 14, wherein the gasket material of the second gasket layer penetrates the GDL.

18. The MEA of claim 14, wherein the second gasket layer is disposed over a portion of a surface of the GDL.

19. The MEA of claim 14, wherein at least one of the first gasket layer and the second gasket layer includes microstructured features.

20. The MEA of claim 14, wherein at least one of the first gasket layer and the second gasket layer are substantially flat.

21. The MEA of claim 14, wherein the MEA is a component of a roll good. the roll good comprising a plurality of MEAs.

22. A fuel cell stack, comprising:
   a membrane electrode assembly, comprising:
      first and second subassemblies, each consisting essentially of:
         a gas diffusion layer (GDL);
         a gasket bonded to the GDL, the gasket comprising:
            a first gasket layer;
            a second gasket layer comprising a gasket material in contact with the first gasket layer and the GDL, the gasket material bonding the first gasket layer to the GDL; and
            an adhesive layer disposed on an opposite surface of the first gasket layer; and
         a catalyst coated membrane between the first and second subassemblies;
      and first and second flow field plates, each flow field plate having an arrangement of flow channels, the flow field plates contacting the gasket of the first and the second subassemblies under compressive force.

23. The fuel cell stack of claim 22, wherein the catalyst coated membrane comprises nanostructured thin film catalyst layers.

24. The fuel cell stack of claim 22, wherein the gasket material of the second gasket layers penetrates the GDLs.

25. The fuel cell stack of claim 22, wherein the second gasket layer is disposed over a portion of a surface of the GDL.

26. The fuel cell stack of claim 22, wherein at least one of the gasket layers includes embossed, microstructured features.

27. A method of making a membrane electrode assembly, comprising:
forming first and second gasketed gas diffusion layer (GDL) subassemblies, the formation of each subassembly comprising:
cutting an aperture in a gasket comprising at least a first gasket layer having an adhesive layer thereon;
positioning a gas diffusion layer over the aperture;
placing a gasket material on the first gasket layer; and
molding the first gasket layers, GDLs, and the flowable gasket material to achieve a bond between the first gasket layers and the GDL, the bond formed by the gasket material; and
thereafter arranging a catalyst coated electrolyte membrane between the first and second gasketed GDL subassemblies.

28. The method of claim 27, wherein arranging the catalyst coated membrane comprises:
placing the catalyst coated membrane on the first gasketed GDL subassembly; and
placing the second GDL subassembly on the catalyst coated membrane and the first gasketed GDL subassembly.

29. The method of claim 27, wherein:
the adhesive layer of the first gasketed GDL subassembly includes a pressure sensitive adhesive layer having a removable adhesive liner; and
further comprising:
removing the adhesive liner before arranging the catalyst coated membrane between the first and second gasketed GDL subassemblies; and
applying pressure to bond the first gasketed GDL subassembly to the second gasketed GDL subassembly via the pressure sensitive adhesive layer.

* * * * *

UNITED STATES PATENT AND TRADEMARK OFFICE
CERTIFICATE OF CORRECTION

PATENT NO. : 7,732,083 B2
APPLICATION NO. : 11/611553
DATED : June 8, 2010
INVENTOR(S) : Andrew J Steinbach It is certified that error appears in the above-identified patent and that said Letters Patent is hereby corrected as shown below:

Column 8
Lines 62-63, delete "material orcomposite" and insert in place thereof -- materials or composite --.

Column 11
Line 14, delete "layers ." and insert in place thereof -- layers. --.

Column 18
Line 4, in Claim 9, delete "claim 1." and insert in place thereof -- claim 1, --.

Line 50, in Claim 21, delete "good." and insert in place thereof -- good, --.

Signed and Sealed this

Ninth Day of November, 2010

David J. Kappos
*Director of the United States Patent and Trademark Office*